United States Patent [19]
Tremblay et al.

[11] Patent Number: 5,857,210
[45] Date of Patent: Jan. 5, 1999

[54] BOUNDED-PAUSE TIME GARBAGE COLLECTION SYSTEM AND METHOD INCLUDING READ AND WRITE BARRIERS ASSOCIATED WITH AN INSTANCE OF A PARTIALLY RELOCATED OBJECT

[75] Inventors: Marc Tremblay, Palo Alto; James Michael O'Connor, Union City, both of Calif.; Guy L. Steele, Jr., Lexington, Mass.; Sanjay Vishin, Sunnyvale, Calif.; Ole Agesen, Franklin, Mass.; Steven Heller, Chelmsford, Mass.; Derek R. White, Reading, Mass.

[73] Assignee: Sun Microsystems, Inc., Palo Alto, Calif.

[21] Appl. No.: 882,801

[22] Filed: Jun. 26, 1997

[51] Int. Cl.[6] ................................................ G06F 12/02
[52] U.S. Cl. .......................................... 707/206; 711/165
[58] Field of Search ............................. 707/206; 711/165

[56] References Cited

U.S. PATENT DOCUMENTS

| | | | |
|---|---|---|---|
| 4,775,932 | 10/1988 | Oxley et al. | 711/166 |
| 4,907,151 | 3/1990 | Bartlett | 711/207 |
| 4,922,414 | 5/1990 | Holloway et al. | 707/206 |
| 4,989,134 | 1/1991 | Shaw | 707/206 |
| 5,088,036 | 2/1992 | Ellis et al. | 707/206 |
| 5,136,706 | 8/1992 | Courts | 707/206 |
| 5,218,698 | 6/1993 | Mandl | 711/165 |
| 5,321,834 | 6/1994 | Weiser et al. | 707/206 |
| 5,560,003 | 9/1996 | Nilsen et al. | 707/206 |
| 5,590,332 | 12/1996 | Baker | 395/705 |
| 5,687,368 | 11/1997 | Nilsen | 707/103 |

OTHER PUBLICATIONS

Richard Jones and Rafael Lins, *Garbage Collection: Algorithms for Automatic Dynamic Memory Management*, Feb. 1997, John Wiley & Sons, entire work and more particularly pp. 1–41 and 116–226.

David A. Barrett, Thesis entitled: *Improving the Performance of Conservative Generational Garbage Collection*, Technical Report CU–CS–784–95, Sep. 1995, pp. 1–64.

Robert Courts, *Improving Locality of Reference in a Garbage–Collecting Memory Management System*, Communications of the ACM, Sep. 1988, vol. 31, No. 9, pp. 1128–1138.

David A. Moon, *Garbage Collection in a Large Lisp System*, In Conference Record of the 1984 ACM Symposium on Lisp and Functional Programming, 1984, pp. 235–246.

Urs Hölzle, *A Fast Write Barrier for Generational Garbage Collectors*, OOPSLA '93 Garbage Collection Workshop, Oct. 1993, pp. 1–6.

David A. Moon, *Architecture of the Symbolics 3600*, IEEE, 1985, pp. 76–83.

Henry G. Baker, Jr., *List Processing in Real Time on a Serial Computer*, Comm. ACM, Apr. 1978, vol. 21, No. 4, pp. 280–294.

David Ungar, *Generation Scavenging: A Non–disruptive High Performance Storage Reclamation Algorithm*, ACM SIGPLAN Notices, May 1984, vol. 19, No. 5, pp. 157–167.

(List continued on next page.)

Primary Examiner—Paul V. Kulik
Attorney, Agent, or Firm—Skjerven, Morrill, MacPherson, Franklin & Friel, LLP; David W. O'Brien

[57] ABSTRACT

A partially relocated object identifier store including "copy from" and "copy to" identifier storage accessible to write and read barrier logic allows the write and read barrier logic to selectively direct store- and load-oriented accesses to an appropriate FromSpace or ToSpace instance of a partially relocated memory object, in accordance with the memory object's partial relocation state. In some embodiments, the barriers trap to a partially relocated object trap handler. In other embodiments, the write barrier itself directs accesses without software trap handler overheads. Optional "how far" indication storage facilitates differentiation by the barrier logic, or by the partially relocated object trap handler, between a copied portion and an uncopied portion of the partially relocated memory object.

54 Claims, 17 Drawing Sheets

OTHER PUBLICATIONS

Guy L. Steele, Jr., *Multiprocessing Compactifying Garbage Collection*, Comm. ACM, Sep. 1975, vol. 18, No. 9, pp. 495–508.

Paul R. Wilson and Thomas G. Moher, *Design of the Opportunistic Garbage Collector*, OOPSLA '89 Proceedings, Oct. 1989, pp. 23–35.

Mario Wolczko and Ifor Williams, *Multi–level Garbage Collection in a High–Performance Persistent Object System*, Proceedings of the Fifth International Workshop on Persistent Object Systems, Sep. 1992, pp. 396–418.

Richard L. Hudson and J. Eliot B. Moss, *Incremental Collection of Mature Objects*, International Workshop IWMM 92, Sep. 1992, pp. 388–403.

David Ungar and Frank Jackson, *Tenuring Policies for Generation–Based Storage Reclamation*, ACM SIGPLAN Notices, 23(11), pp. 1–17 (1988).

David Ungar and Frank Jackson, *An Adaptive Tenuring Policy for Generation Scavengers*, ACM Transactions on Programming Languages and Systems, 14(1), pp. 1–27 (1992).

Edsger W. Dijkstra, Leslie Lamport, A.J. Martin, C.S. Scholten, and E.F.M. Steffens, *On–the–Fly Garbage Collection: An Exercise in Cooperation*, Communications of the ACM, 21(11), pp. 966–975 (1978).

H.T. Kung & S.W. Song, *An Efficient Parallel Garbage Collection System and its Correctness Proof*, IEEE Symposium on Foundations of Computer Science, pp. 120–131 (1977).

Rodney A. Brooks, *Trading Data Space for Reduced Time and Code Space in Real–time Garbage Collection on Stock Hardware*, in Conference Record of the 1984 ACM Symposium on Lisp and Functional Programming, Austin, Texas, pp. 256–262 (1984).

Jeffrey L. Dawson, *Improved Effectiveness from a Real Time Lisp Garbage Collector*, Conference Record of the 1982 ACM Symposium on Lisp and Functional Programming, Pittsburgh, PA, pp. 159–167 (1982).

FIG. 4A
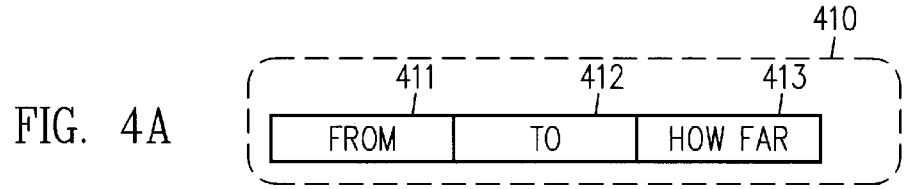
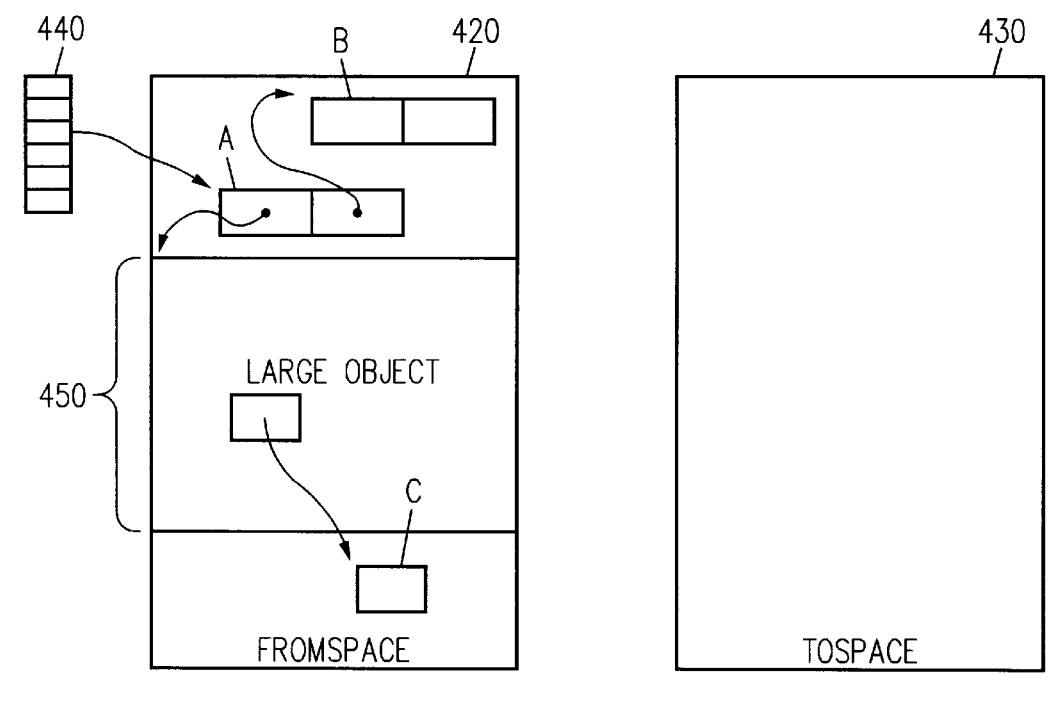
FIG. 4B

BOUNDED-PAUSE TIME GARBAGE COLLECTION SYSTEM AND METHOD INCLUDING READ AND WRITE BARRIERS ASSOCIATED WITH AN INSTANCE OF A PARTIALLY RELOCATED OBJECT

RELATED APPLICATIONS

Bounded-Pause Time Garbage Collection System and Method including Write Barrier Associated with a Source Instance of a Partially Relocated Object, naming Marc Tremblay, James Michael O'Connor, Guy L. Steele, Jr., Sanjay Vishin, Ole Agesen, Steven Heller, and Derek R. White as inventors, Ser. No.: 08/883,291, filed on even date herewith.

Bounded-Pause Time Garbage Collection System and Method including Write Barrier associated with Source and Target Instances of a Partially Relocated Object, naming Marc Tremblay, James Michael O'Connor, Guy L. Steele, Jr., Sanjay Vishin, Ole Agesen, Steven Heller, and Derek R. White as inventors, Ser. No.: 08/882,796, filed on even date herewith.

BACKGROUND OF THE INVENTION

1. Field of the Invention

The present invention relates to garbage collection, and in particular, to methods and apparati for facilitating bounded pause time garbage collection.

2. Description of the Related Art

Traditionally, most programming languages have placed responsibility for dynamic allocation and deallocation of memory on the programmer. For example, in the C programming language, memory is allocated from the heap by the malloc procedure (or its variants). Given a pointer variable, p, execution of machine instructions corresponding to the statement p=malloc (sizeof (SomeStruct)) causes pointer variable p to point to newly allocated storage for a memory object of size necessary for representing a SomeStruct data structure. After use, the memory object identified by pointer variable p can be deallocated, or freed, by calling free (p). Pascal and C++ languages provide analogous facilities for explicit allocation and deallocation of memory.

Unfortunately, dynamically allocated storage may become unreachable if no reference, or pointer, to the storage remains in the set of root reference locations for a given computation. Memory objects that are no longer reachable, but have not been freed, are called garbage. Similarly, storage associated with a memory object can be deallocated while still referenced. In this case, a dangling reference has been created. In general, dynamic memory can be hard to manage correctly. In most programming languages, heap allocation is required for data structures that survive the procedure that created them. If these data structures are passed to further procedures or functions, it may be difficult or impossible for the programmer or compiler to determine the point at which it is safe to deallocate them.

Because of this difficulty, garbage collection, i.e., automatic reclamation of heap-allocated storage after its last use by a program, can be an attractive alternative model of dynamic memory management. Garbage collection is particularly attractive for functional languages, such as the JAVA™ language (JAVA and JAVA-based trademarks are trademarks or registered trademarks of Sun Microsystems, Inc. in the United States and other countries), Prolog, Lisp, Smalltalk, Scheme, Eiffel, Dylan, ML, Haskell, Miranda, Oberon, etc., which exhibit data sharing, delayed execution, and generally, less predictable execution orders than the procedural languages. See generally, Jones & Lins, *Garbage Collection: Algorithms for Automatic Dynamic Memory Management*, pp. 1–41, Wiley (1996) for a discussion of garbage collection and the classical algorithms therefor.

Three classical garbage collection methods are reference counting, mark-sweep, and copying storage reclamation. The first, reference counting, is based on maintaining a count of the number of references, e.g., pointers, to each memory object from active memory objects or root reference locations. When a new memory object is allocated and a pointer thereto is assigned, the memory object's reference count is set to one. Then, each time a pointer is set to refer to the memory object, the memory object's reference count is incremented. When a reference to the memory object is deleted or overwritten, the reference count is decremented. Memory objects with a reference count of zero are unreachable and can be collected as garbage. A reference counting garbage collector implementation typically includes an additional field, the reference count, in each memory object and includes incrementing and decrementing support as part of new object, delete object and update pointer functions.

In contrast, tracing collector methods involve traversal of reference chains through memory to identify live, i.e., referenceable, memory objects. One such tracing collector method is the mark-sweep method in which reference chains through memory are traversed to identify and mark live memory objects. Unmarked memory objects are garbage and are collected and returned to the free pool during a separate sweep phase. A mark-sweep garbage collector implementation typically includes an additional field, e.g., a mark bit, in each memory object. Mark-compact collectors add compaction to the traditional mark-sweep approach. Compaction relocates live objects to achieve beneficial reductions in fragmentation. Reference count methods may also employ compaction.

Another tracing method, copying collection, divides memory (or a portion thereof) into two semi-spaces, one containing current data and the other containing old data. Copying garbage collection begins by reversing the roles of the two semi-spaces. The copying collector then traverses the live objects in the old semi-space, FromSpace, copying reachable objects into the new semi-space, ToSpace. After all the live objects in FromSpace have been traversed and copied, a replica of the data structures exists in ToSpace. In essence, a copying collector scavenges live objects from amongst the garbage. A beneficial side effect of copying collection is that live objects are compacted into ToSpace, thereby reducing fragmentation.

Generational approaches build on the observations that (1) memory objects typically die young and that (2) tracing methods spend considerable resources traversing, copying, or relocating comparatively long-lived objects. Generational garbage collection schemes divide the heap into two or more generations, segregating objects by age, and concentrate collection efforts (or at least more vigorous collection efforts) on the younger generation(s). Since the youngest generation is small, garbage collection related pause times can, on average, be kept short. Garbage collection within a generation can be by either copying or mark-sweep collection. Promotion of memory objects from a younger to an older generation typically involves copying.

Because of the cost of copying large objects, some generational approaches have included large object areas. See e.g., Ungar and Jackson, *Tenuring Policies for*

*Generation-based Storage Reclamation,* ACM SIGPLAN Notices, 23(11), pp. 1–17 (1988), Ungar and Jackson, *An Adaptive Tenuring Policy for Generation Scavengers,* ACM Transactions on Programming Languages and Systems, 14(1), pp. 1–17 (1992). Typically, the technique is to separate a large object into a header portion stored in the generational part of the heap and a body portion stored in the large object area. The header portions are scavenged like other objects, but resources are not expended to copy the body portions. Ungar and Jackson found that pause times could be reduced by a factor of four by allocating 330 Kbytes to a large object area.

For interactive or real-time applications, the shortness of garbage collection pauses is an important figure of merit. Traditional implementations of tracing garbage collectors periodically interrupt execution of application programs in order to traverse memory in search of memory regions that are no longer in use. Unfortunately, hard real-time systems require worst-case guarantees that results be computed on-time. Even in mere interactive systems, pause time should be bounded and short. So-called incremental garbage collection methods attempt to avoid lengthy pauses caused by start and stop reclamation and instead interleave collection with application program cycles. To achieve this goal, an incremental collector must coherently manage heap accesses by the collector and application program (often more generally referred to as a mutator). Concurrent collectors, e.g., in a multiprocessor, present similar, though more stringent fine grain synchronization requirements.

In general, interleaved or concurrent relocating collectors present multiple-readers, multiple writers synchronization problems. Both read and write barrier methods have been used to prevent a mutator from disrupting garbage collection by altering the connectivity of the memory object referencing graph in a way that interferes with the collector's traversal thereof. See e.g., Steele, *Multiprocessing Compactifying Garbage Collection,* Communications of the ACM, 18(9), pp. 495–508 (1975) (write barrier, mark-sweep-compact collection); Dijkstra et al., *On-the-fly Garbage Collection: An Exercise in Cooperation,* Communications of the ACM, 21(11), pp. 965–975 (1978) (write barrier); Kung & Song, *An Efficient Parallel Garbage Collection System and its Correctness Proof,* IEEE Symposium on Foundations of Computer Science, pp. 120–131 (1977) (write barrier); Baker, List Processing in Real-time on a Serial Computer, Communications of the ACM, 21(4), pp. 280–93 (1978) (read barrier, copying collector); Brooks, *Trading Data Space for Reduced Time and Code Space in Real-time Garbage Collection on Stock Hardware,* in Conference Record of the 1984 ACM Symposium on Lisp and Functional Programming, Austin, Texas, pp. 256–62 (1984) (write barrier, copying collector); and Dawson, *Improved Effectiveness from a Real-time Lisp Garbage Collector,* Conference Record of the 1992 ACM Symposium on Lisp and Functional Programming, San Fransisco, Calif., pp. 159–67 (1982) (write barrier, copying collector).

The Symbolics 3600 provided hardware read-barrier and write-barrier support for Baker style copying collection and for trapping intergenerational pointer stores. See Moon, *Architecture of the Symbolics* 3600, Proceedings of the 12th Annual International Symposium on Computer Architecture, pp. 76–83 (1985). The MIT Lisp machine and TI Explorer also provided hardware read-barrier support for Baker style copying collection. Nilsen and Schmidt describe a garbage collected memory module which implements hardware read- and write-barriers in U.S. Pat. No. 5,560,003.

In addition to the fundamental challenge of managing mutator accesses to prevent alterations to the connectivity of the memory object referencing graph in a way that would interfere with the collector's traversal thereof, bounded pause time relocating collectors should address the substantial period of time required to relocate a large and/or popular memory object. A garbage collector can ensure that memory objects can be completely relocated within a bounded interval, by relegating large objects incompatible with the bounded interval to a large object area which may be collected by a non-relocating method (see e.g., Ungar and Jackson, *Tenuring Policies for Generation-based Storage Reclamation,* ACM SIGPLAN Notices, 23(11), pp. 1–17 (1988)) or may be uncollected. However, lazy or incremental copying approaches are preferable.

Baker's solution was to include an additional link word in the header of large objects. In a FromSpace instance of the object, the link word stored a forwarding address to a ToSpace instance of the object. In the ToSpace instance of the object, the link word stored a backward link to the FromSpace instance. After the forwarding and backward links are set, the object was copied incrementally. Like small objects, fields of the large object were copied and scanned for pointers back into FromSpace objects that had not yet been copied. Baker used the scanned/unscanned boundary, defined by a garbage collection variable, scan, to steer write accesses to the partially copied large object. The cost of Baker's scheme, apart from an additional header word was a software write-barrier to writes into the ToSpace instance of the large object. If the address was greater than scan, the write was performed in the OldSpace instance using the backward link; otherwise the write was performed in the NewSpace instance.

Nilsen and Schmidt presented a hardware solution based on Baker's copying collector. In particular, Nilsen and Schmidt provided a garbage collected memory module in which a hardware read-barrier maintains the illusion that collection is complete. A hardware arbiter in the garbage collected memory module provided a hardware Baker-type read-barrier, and in addition provided read and write barriers to accesses into an as yet uncopied portion of an object instance in ToSpace. The garbage collected memory module maintained memory address registers to indicate the beginning and end of the uncopied portion. Read and write accesses to the uncopied portion were directed to the FromSpace instance.

SUMMARY OF THE INVENTION

Accordingly, it has been discovered that a write barrier to stores into a partially relocated large and/or popular memory object and a read barrier to loads therefrom a facilitates bounded pause time implementations of relocating garbage collectors, including e.g., copying collectors, generational collectors, and collectors providing compaction. Partially relocated object identifier storage and write and read barriers responsive thereto allows relocation of large and/or popular memory objects by a garbage collector implementation to be interrupted so as to meet bounded pause time guarantees to a mutator process. In particular, such a configuration facilitates incremental object copying and incremental update of pointers thereto while supporting overlapped source and target instances.

A partially relocated object identifier store including "copy from" and "copy to" identifier storage accessible to write and read barrier logic allows the write and read barrier logic to selectively direct store- and load-oriented accesses to an appropriate FromSpace or ToSpace instance of a partially relocated memory object, in accordance with the memory object's partial relocation state. In some embodiments, the barriers trap to a partially relocated object trap handler. In other embodiments, the write barrier itself directs accesses without software trap handler overheads. Optional "how far" indication storage facilitates differentiation by the barrier logic, or by the partially relocated object trap handler, between a copied portion and an uncopied portion of the partially relocated memory object. Some embodiments may not differentiate between copied and uncopied portions of the partially relocated object. Furthermore, although "Copy to" and "Copy From" identifier storage accessible to the write barrier advantageously allows the write barrier logic to maintain consistency between FromSpace and ToSpace instances of a partially relocated memory object without software trap handler overhead, some embodiments may include such a software trap handler. A variety of alternative allocations of functionality between write barrier logic and a partially relocated object trap handler are envisioned and fall within the scope of the claims.

BRIEF DESCRIPTION OF THE DRAWINGS

The present invention may be better understood, and its numerous objects, features, and advantages made apparent to those skilled in the art by referencing the accompanying drawings.

FIGS. 4a and 4b (collectively referred to herein as FIG. 4) depict one embodiment of partially relocated object identifier store and an exemplary memory object referencing graph in accordance with an semispace memory organization for a copying garbage collector prior to copying.

FIG. 6 illustrates operation of a write barrier of the hardware processor of FIG. 1 in conjunction with the partially relocated object identifier store of FIGS. 4 and 5.

The use of the same reference symbols in different drawings indicates similar or identical items.

DESCRIPTION OF THE PREFERRED EMBODIMENT(S)

Figure 1A:
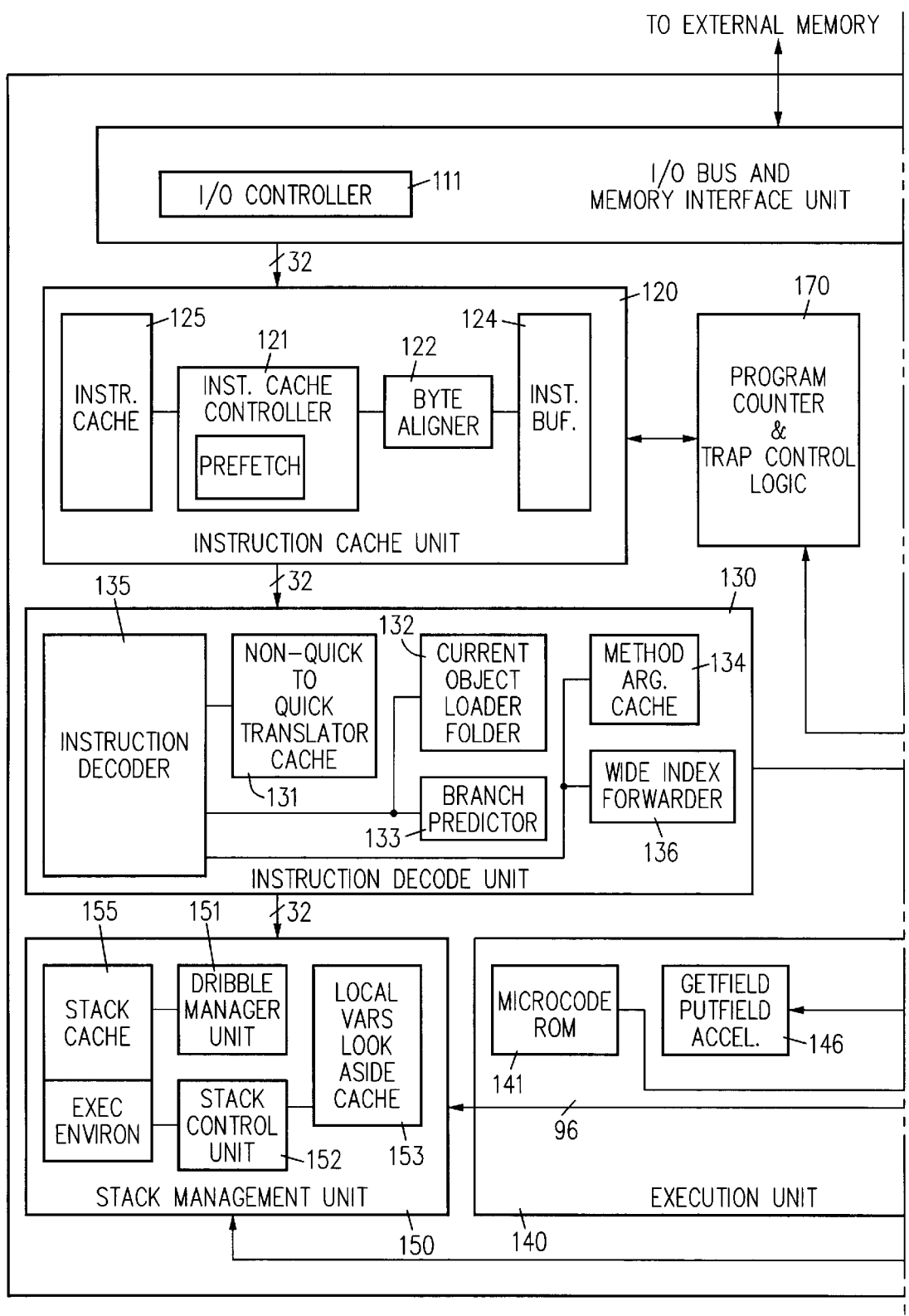
FIGS. 1a and 1b (collectively referred to herein as FIG. 1) are a block diagram of an exemplary embodiment of a virtual machine hardware processor that includes support for bounded pause-time garbage collector implementations in accordance with this invention.

The following sets forth a detailed description of the best contemplated mode for carrying out the invention. The description is intended to be illustrative of the invention and should not be taken to be limiting.

Architectural support for bounded pause time implementations of relocating garbage collectors includes storage to identify locations from which (and in some embodiments, to which) a large and/or popular memory object is being relocated. As used herein, a large object is any memory object of size, structure, or content such that relocation of the complete memory object, potentially including updates of references thereto, may, under worst case conditions, be incompatible with bounded pause time guarantees of a garbage collector implementation. Embodiments in accordance with the present invention will exhibit varying degrees of conservatism with respect to operative definitions of a large object. For example, some embodiments may employ a size threshold, whereas others may include reference counts in the large object calculus. Still other embodiments, particularly those based substantially on hardware, may exploit the architectural support described herein without regard to memory object size. As used herein, a popular object is any memory object having a reference count such that relocation of the memory object, including updates of references thereto, may, under worst case conditions, be incompatible with bounded pause time guarantees of a garbage collector implementation. As above, embodiments in accordance with the present invention will exhibit varying degrees of conservatism with respect to operative definitions of a popular object.

In general, embodiments in accordance with the present invention may employ architectural support described herein for relocating large objects, popular objects, large and popular objects, all objects (including but not limited to large and/or popular objects), etc. Although such architectural support may be provided in hardware, in software, or in a combination of hardware and software, embodiments in which the architectural support is provided substantially in hardware will typically provide both increased performance and reduced memory requirement advantages. For this reason, an exemplary hardware processor embodiment is described herein. However, based on this description, those of skill in the art will appreciate alternative embodiments which fall within the scope of the claims which follow.

As used herein, relocating garbage collector is any garbage collector which as part of its operation relocates memory objects, including e.g., copying collectors, generational collectors, and collectors providing compaction or object relocation to reduce fragmentation and/or improve locality. Real-time or bounded pause time implementations of such relocating garbage collectors will typically be implemented as an incremental garbage collection software process whose computations are interleaved with user process activity. However, those of skill in the art will recognize concurrent garbage collection implementations based on the description herein. Furthermore, those of skill in the art will recognize suitable modifications, including provision of storage to identify multiple partially relocated objects, to support parallel collection implementations.

A JAVA Virtual Machine Instruction Processor Embodiment

Figure 1B:
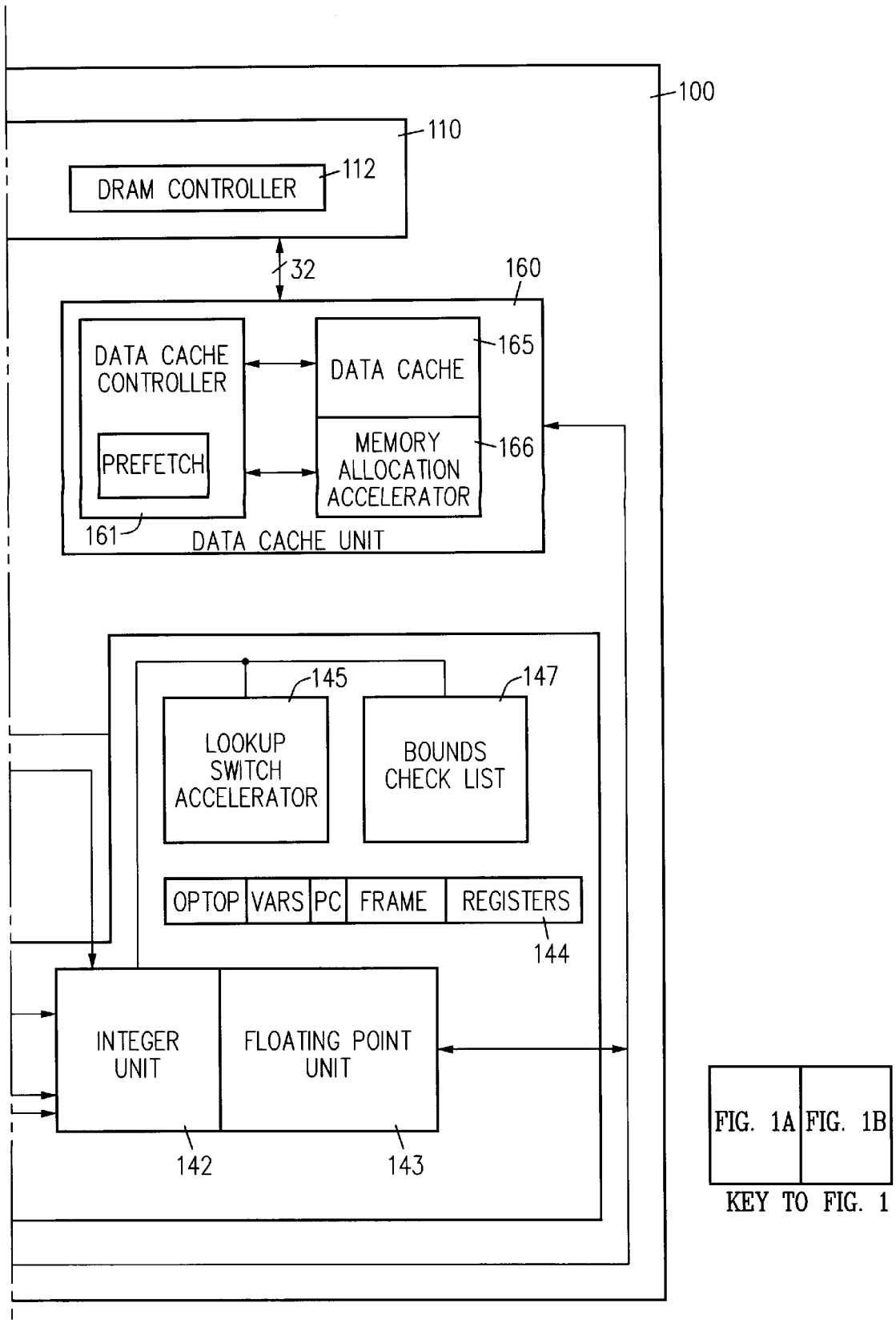

FIG. 1 depicts an exemplary hardware embodiment of a virtual machine instruction processor 100, hereinafter hardware processor 100, that includes support for bounded pause time relocating garbage collection in accordance with the present invention, and that directly executes processor architecture independent JAVA virtual machine instructions. The performance of hardware processor 100 in executing virtual machine instructions is typically better than high-end CPUs, such as the Intel PENTIUM microprocessor or the Sun Microsystems ULTRASPARC processor, (All SPARC trademarks are used under license and are trademarks or registered trademarks of SPARC International, Inc., in the United States and other countries. Products bearing SPARC trademarks are based upon an architecture developed by Sun Microsystems, Inc. PENTIUM is a trademark of Intel Corp. of Sunnyvale, Calif.) interpreting the same virtual machine instructions with a software JAVA interpreter or with a JAVA just-in-time (JIT) compiler. In addition, hardware processor 100 is low cost and exhibits low power consumption. As a result, hardware processor 100 is well suited for portable applications.

Because hardware processor 100 provides a JAVA virtual machine instruction processor implementation substantially in hardware, 25–50 Kilobytes (Kbytes) of memory storage, e.g., read-only memory or random access memory, otherwise required by a software interpreter can be eliminated or alternatively allocated. Hardware support for garbage collection provides further advantages for a limited memory JAVA virtual machine implementation by reducing in-line code for garbage collection (e.g., compiler supplied read and/or write barrier support), by facilitating improved utilization of limited memory, and by reducing garbage collection overheads and pause times. In environments where the expense of a large memory is prohibitive, including, for example, an Internet chip for network appliances, a cellular telephone processor, other telecommunications integrated circuits, or other low-power, low-cost applications such as embedded processors, and portable devices, hardware processor 100 is advantageous.

Even in environments where large memory is viable, hardware support for garbage collection reduces overheads associated with barrier implementations, facilitates improved utilization of memory, and reduces pause times for relocating garbage collector implementations. In particular, hardware processor 100 provides advantages for garbage collection methods and implementations in the context of an exemplary JAVA virtual machine implementation. However, based on the description herein, those of skill in the art will recognize variations for other JAVA virtual machine implementations, including e.g., interpreted and JIT compiler JAVA virtual machine implementations, as well as for other non-JAVA virtual machine implementations.

As used herein, a virtual machine is an abstract computing machine that, like a real computing machine, has an instruction set and uses various memory areas. A virtual machine specification defines a set of processor architecture independent virtual machine instructions that are executed by a virtual machine implementation. In general, a virtual machine implementation may be in hardware (e.g., as in the case of hardware processor 100), in software (e.g., as in the case of interpreted and JIT compiler implementations), or in hardware and software. Each virtual machine instruction defines a specific operation that is to be performed. The virtual machine need not understand the computer language that is used to generate virtual machine instructions or the underlying implementation of the virtual machine. Only a particular format for virtual machine instructions needs to be understood. In an exemplary embodiment, the virtual machine instructions are JAVA virtual machine instructions. Each JAVA virtual machine instruction includes one or more bytes that encode instruction identifying information, operands, and any other required information.

In this embodiment, hardware processor 100 (FIG. 1) processes the JAVA virtual machine instructions, which include bytecodes. Hardware processor 100 directly executes most of the bytecodes. However, execution of some of the bytecodes is implemented via microcode. Lindholm & Yellin, The *JAVA™ Virtual Machine Specification* (Addison-Wesley, 1996), ISBN 0-201-63452-X, which is incorporated herein by reference in its entirety, includes an exemplary set of JAVA virtual machine instructions. The particular set of virtual machine instructions supported by a hardware processor 100 is not an essential aspect of this invention. However, in view of the virtual machine instructions, those of skill in the art can modify the invention for a particular set of virtual machine instructions, or for changes to the JAVA virtual machine specification.

In one embodiment, hardware processor 100 includes an I/O bus and memory interface unit 110, an instruction cache unit 120 including instruction cache 125, an instruction decode unit 130 including non-quick to quick translator cache 131, a unified execution unit 140, a stack management unit 150 including stack cache 155, a data cache unit 160 including data cache 165, and program counter and trap control logic 170. Support for garbage collection features described herein resides primarily in integer unit 142 and register 144 of execution unit 140 with some additional support in program counter and trap control logic 170 (including e.g., support for forcing the program counter to a next JAVA virtual machine instruction following a trapping store). Each of these units is described below. In addition, an exemplary embodiment of hardware processor 100 is described in greater detail in co-pending U.S. patent application Ser. No.: 08/786,351, entitled, "INSTRUCTION FOLDING FOR A STACK-BASED MACHINE," naming James Michael O'Connor and Marc Tremblay as inventors, filed Jan. 23, 1997, the entirety of which is hereby incorporated by reference.

Figure 2:
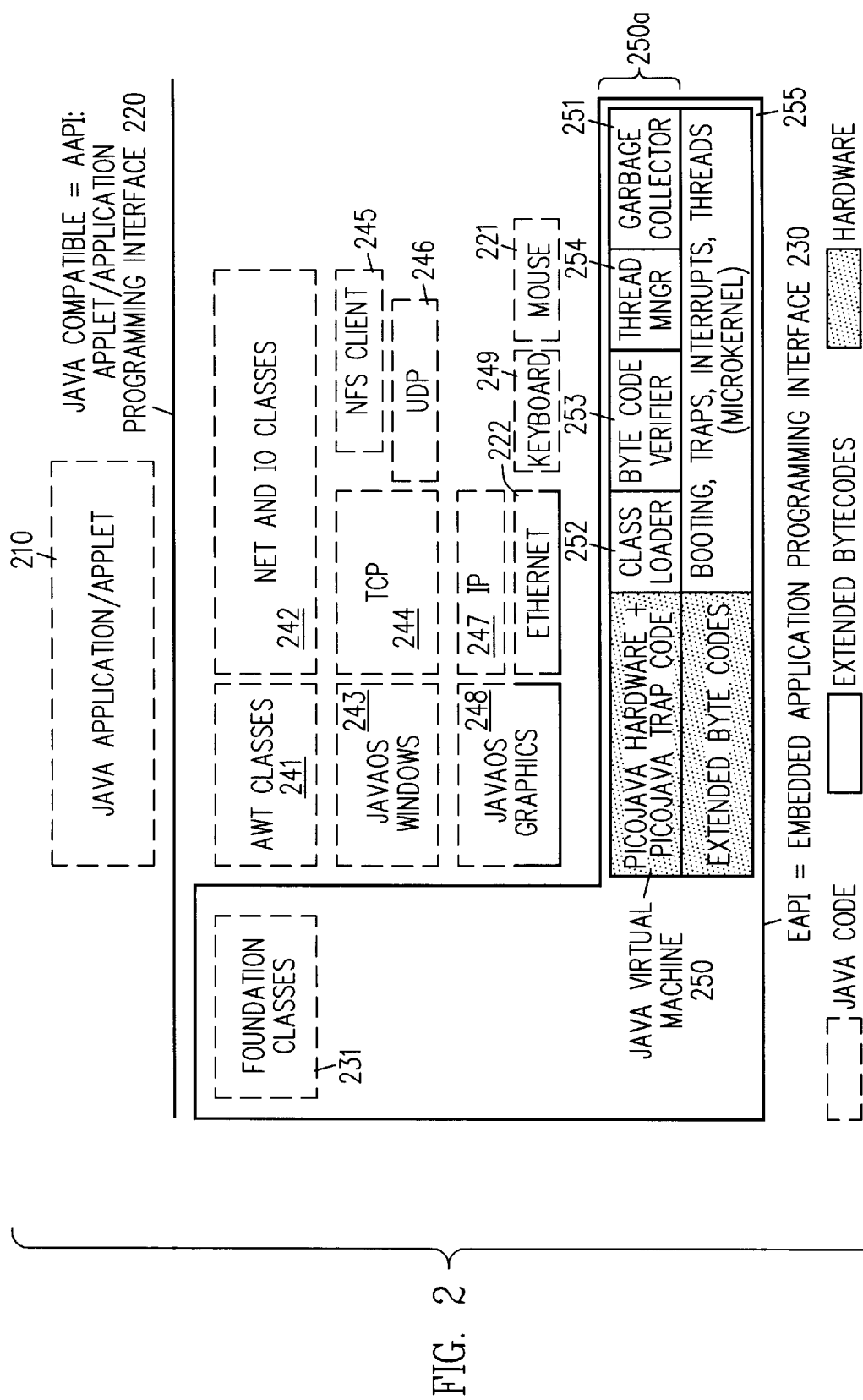
FIG. 2 depicts "builds upon" relationships between software and hardware components of a JAVA application environment including hardware processor (FIG. 1) and software components of an exemplary JAVA virtual machine implementation.

FIG. 2 depicts a "builds upon" relationship between software and hardware components of a JAVA application environment such as, for example, an application environment partially defined by and partially executable on hardware processor 100 (FIG. 1). JAVA application/applet software 210 exploits software components defining an applet/application programming interface 220 including AWT classes 241, net and I/O classes 242, and JAVA OS windows 243, JAVA OS graphics 248, TCP 244, NFS 245, UDP 246, IP 247, Ethernet 222, keyboard 249, and mouse 221 software components, which in one embodiment include JAVA bytecodes. In the embodiment of FIG. 2, JAVA OS graphics 248 and Ethernet 222 software components also include extended bytecodes beyond those defined by the baseline JAVA Virtual Machine Specification. Components of an embedded application programming interface (EAPI) 230 include foundation classes 231 and hardware and software components of JAVA virtual machine implementation 250 in accordance with the JAVA Virtual Machine Specification.

JAVA virtual machine implementation 250 includes hardware processor 100 and trap code executable thereon to evaluate JAVA virtual machine instructions. In addition, JAVA virtual machine implementation 250 includes hardware support for extended bytecodes (including e.g., pointer store bytecodes and memory access barriers described below in the context of garbage collection); class loader 252, byte code verifier 253, thread manager 254, and garbage collector 251 software, and microkernel 255. JAVA virtual machine implementation 250 includes a JAVA virtual machine specification compliant portion 250a as well as implementation dependent portions. Although the JAVA virtual machine specification specifies that garbage collection be provided, the particular garbage collection method employed is implementation-dependent.

Architectural features for garbage collection described herein in the context of an exemplary hardware processor 100 embodiment of JAVA virtual machine implementation 250 are particularly adapted for generational garbage collection methods. However, based on this description, those of skill in the art will recognize the application of bounded-pause time support of this invention to relocating collectors in general, including e.g., non-generational collector implementations, incremental mark-compact collectors, copying collectors, etc.

Figure 3:
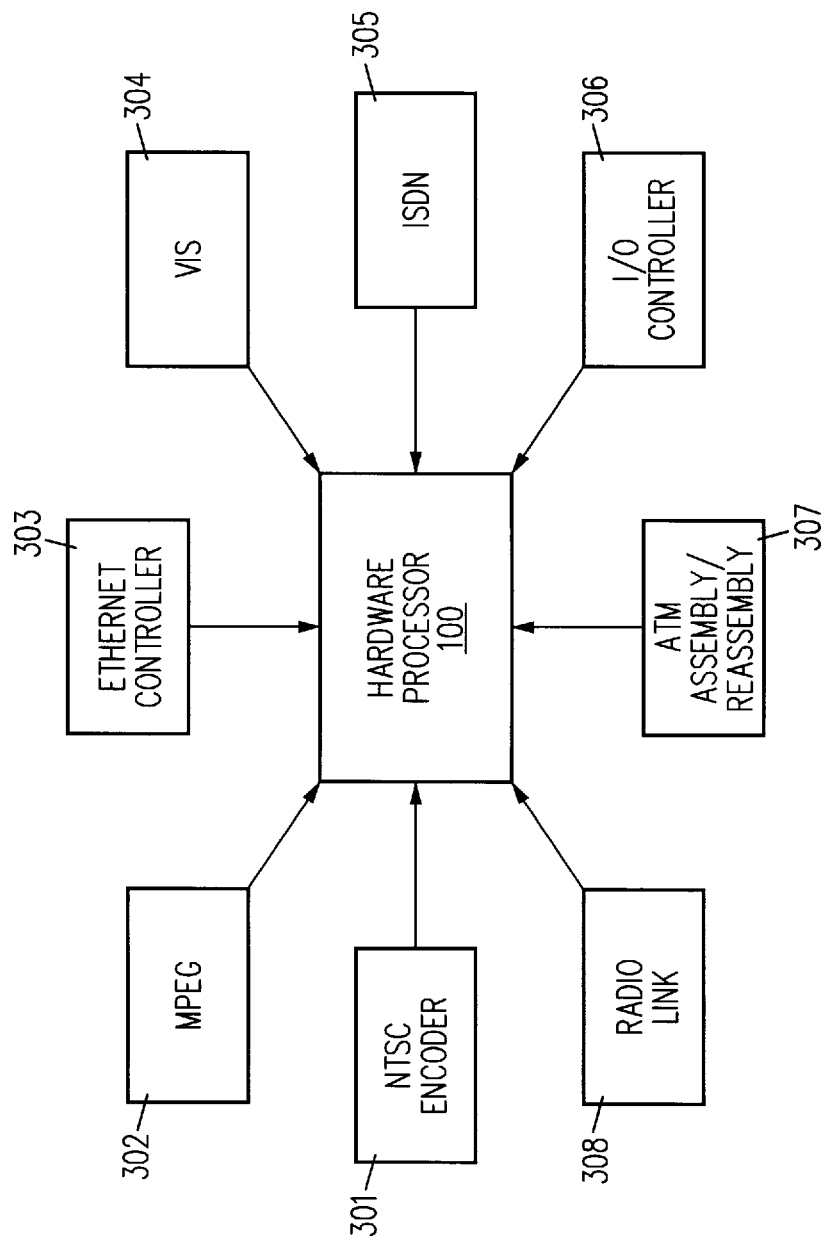
FIG. 3 illustrates several possible add-ons to the hardware processor of FIG. 1.

FIG. 3 illustrates several possible add-ons to hardware processor 100 to create more complicated system. Circuits supporting any of the eight functions shown, i.e., NTSC encoder 501, MPEG 502, Ethernet controller 503, VIS 504, ISDN 505, I/O controller 506, ATM assembly/reassembly 507, and radio link 508 can be integrated into the same chip as hardware processor 100 of this invention.

In addition, those of skill in the art will appreciate a wide variety of computer systems incorporating hardware processor 100, including embodiments of hardware processor 100 with any of the above-described add-on circuits. An exemplary computer system embodiment includes physical memory storage (e.g., RAM and/or ROM), computer readable media access devices (e.g., disk, CD-ROM, tape, and/or memory technology based computer readable media access devices, etc.), input/output device interfaces (e.g., interfaces for keyboard and/or pointing devices, for display devices, etc.), and communications devices and/or interfaces. Suitable communications devices and/or interfaces include those for network- or telephony-based communications, for interfacing with communications networks including land-line and/or wireless portions of a public switched network, private networks, etc. In some embodiments of this invention, instruction streams (including e.g., JAVA bytecodes) are transmitted and/or received for execution by hardware processor 100 via such communications devices or interfaces.

Architectural Support for Garbage Collection

Hardware processor 100 provides hardware support for a variety of garbage collection methods, including relocating collector methods implemented as garbage collection software executable thereon. In particular, hardware processor 100 includes a partially relocated object identifier store and barrier support. In some embodiments such barrier support includes write barrier support for programmer selectable filtering of stores and/or support for execution-time resolution of store bytecodes to pointer-specific bytecodes to facilitate pointer store trapping, each as described in greater detail in a co-pending U.S. patent application Ser. No.: 08/841,543, entitled "GENERATION ISOLATION SYSTEM AND METHOD FOR GARBAGE COLLECTION," naming James Michael O'Connor, Marc Tremblay, and Sanjay Vishin as inventors and filed Apr. 23, 1997, the entirety of which is hereby incorporated by reference.

Partially Relocated Object Identifier Store

FIG. 4A depicts one embodiment of a partially relocated object identifier store 410 including from field 411, to field 412 and howfar field 413. FIG. 4B depicts FromSpace 420 and ToSpace 430 portions of memory storage in accordance with a copying collector method. In a generational collector implementation, FromSpace 420 and ToSpace 430 portions may be semi-spaces of a single generation or may be portions of young and old generation spaces respectively. Alternatively, FromSpace 420 and ToSpace 430 portions may be semi-spaces in a non-generational collection space. Furthermore, FromSpace 420 and ToSpace 430 portions may overlap, may individually be contiguous or non-contiguous, are not necessarily of fixed size or have fixed locations in the memory storage. Additionally, in some embodiments, multiple FromSpace and ToSpace portions are supported with suitable modifications to partially relocated object identifier store 410 and to the barriers described herein. FIG. 4B depicts a first referencing state of live memory objects A, B, C and large object 450 prior to copying into ToSpace 430. Root pointer set 440 is representative of any root pointer set into the referencing structure, including e.g., pointers which originate from entries of operand stack and/or local variables storage represented in stack cache 155.

Figure 5:
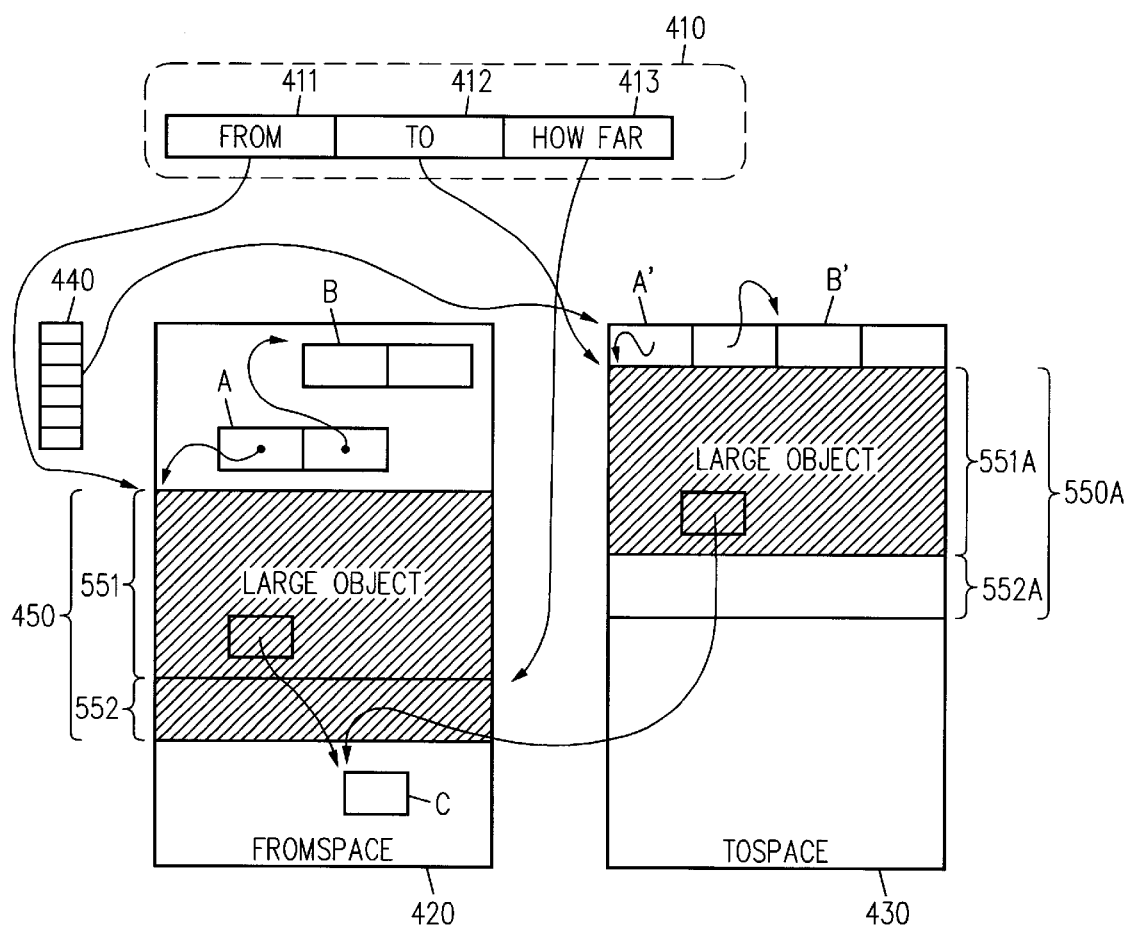
FIG. 5 depict the partially relocated object identifier store and semispace memory organization of FIG. 4 during copying of a large object from FromSpace to ToSpace.

FIG. 5 depicts a second referencing state of partially relocated object identifier store 410, FromSpace 420, and ToSpace 430 at interruption of large object 450 relocation. Live memory objects A and B have been copied to corresponding instances A' and B' in ToSpace 430. Upon interruption of the copying, large object 450 includes a copied portion 551 and a not completely copied portion 552. Contents of the copied portion 551 of large object 450 have been copied to a corresponding portion 551a of a ToSpace 430 instance of large object 450. ToSpace 430 storage for the remaining not completely copied portion of large object 450 is shown as portion 552a. From field 411 identifies large object 450 in FromSpace 420, to field 412 identifies the corresponding partially relocated instance 450a of large object 450, and howfar field 413 identifies a boundary between copied portion 551 and not completely copied portion 552 of large object 450. An overlapping copy direction field (not shown) is optional. In one embodiment, such a copy direction field includes a copy direction bit whose state indicates a forward or backward direction for copying of overlapped FromSpace and ToSpace instances. In other embodiments, copy direction is derived from the relative values of from field 411 and to field 412, as will be appreciated by those of skill in the art.

Howfar field 413 indicates the progress of large object copying and/or enables write barrier hardware and a partially relocated object trap handler to appropriately handle mutator accesses to a partially copied large object. In the embodiment of FIG. 5, howfar field 413 indicates the address in memory of the boundary between copied portion 551 and uncopied portion 552. Nonetheless, those of skill in the art will recognize, based on this description, a variety of suitable alternative encodings including, e.g., an index off of the memory location indicated by from field 411, an indication of a corresponding boundary in the ToSpace instance 550a of large object 450, etc. Howfar field 413 encodes any such suitable indication.

Figure 6:
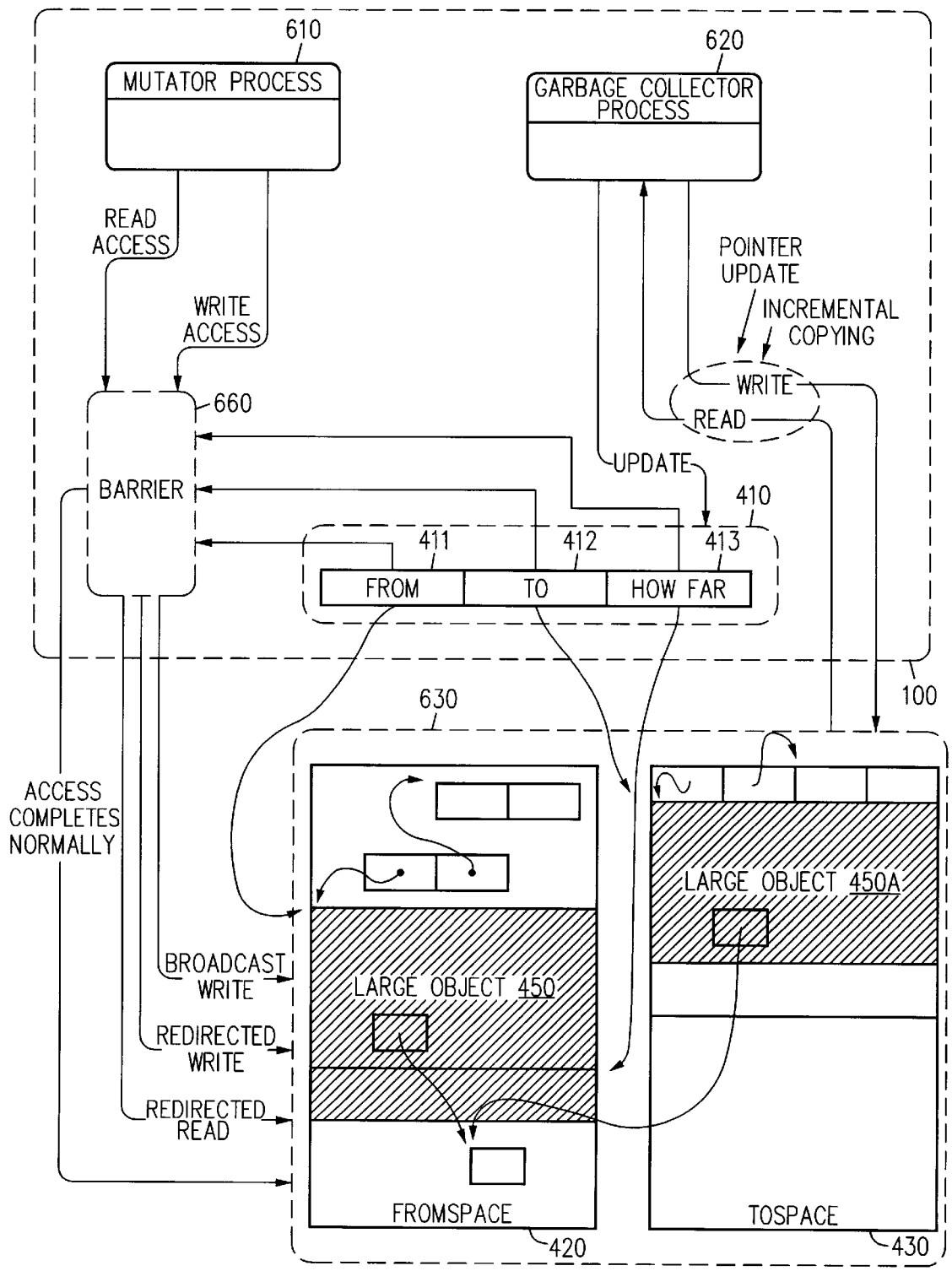
FIG. 6 depicts accesses of a copying collector process and of a mutator process to FromSpace and ToSpace portions of a collected memory area that includes a partially relocated large object.

Referring now to FIG. 6, partially relocated object identifier store 410 is shown in the context of mutator process 610 and garbage collector process 620. In the embodiment of FIG. 6, mutator process 610 and garbage collector process 620 are each defined by JAVA virtual machine instructions executable by hardware processor 100. Garbage collector process 620 includes any relocating collector. Although the description which follows is for the semi-space copying collector described above with reference to FIG. 5, those of skill in the art will recognize the applicability to other relocating collectors. In the course of copying large object 450 from FromSpace 420 to ToSpace 430, garbage collector process 620 reads from and writes to collected space 630.

In one embodiment, garbage collector process 620 updates from field 411 and to field 412 at the beginning of large object 450 copying and updates howfar field 413 during copying such that, upon interruption by mutator process 610, howfar field 413 indicates the boundary between copied portion 551 and uncopied portion 552. In embodiments for concurrent mutator process 610 and garbage collector process 620 execution (e.g., in a multiprocessor), locking of howfar field 413 is provided and suitable methods therefor will be recognized by those of skill in the art. Alternative embodiments may optionally forgo incremental updating of howfar field 413 in favor of an update on interruption.

Mutator process 610 reads from and writes to memory which includes collected space 630. In one embodiment, hardware processor 100 includes integer unit 142 support for a barrier 660 which compares object referencing information (e.g., an objectref) to contents of from field 411, to field 412, or both. A match with contents of from field 411 indicates that the referenced object is the FromSpace 420 instance of partially relocated large object 450. A match with contents of to field 412 indicates that the referenced object is the partially copied ToSpace 430 instance 450a. In some embodiments, evaluation of the particular field offset into the referenced object is compared against contents howfar field 413 to refine barrier 660 handling of copied and uncopied portions of the referenced object.

In various embodiments more particularly described below, barrier 660 includes write barrier support responsive to partially relocated object identifier store 410. In some embodiments, barrier 660 also includes read barrier support responsive to partially relocated object identifier store 410. In some embodiments, barrier 660 includes hardware read and/or write barrier support for trapping to a software partially relocated object trap handler which appropriately handles the trapping access (e.g., by broadcasting a write access, redirecting a write access, redirecting a read access, or allowing an access to complete normally). In other embodiments, a hardware read and/or write barrier itself provides such appropriate handling without software trap handler overhead.

In some embodiments, bounded pause time relocation is provided by elements of barrier 660 that allow incremental copying of a large and/or popular object while pointer updates thereto are via an object referencing handle. In such embodiments, pointer updates to even popular objects are trivially provided by update of a single pointer, i.e., of the object referencing handle. In other embodiments, bounded pause time relocation provided by elements of barrier 660 includes support for incremental updating of pointers to a popular, and possibly large, object. As used herein, bounded pause time relocation includes both copying and pointer update. Those of skill in the art will appreciate the applicability of embodiments described herein to bounded pause time relocation of large objects, to bounded pause time relocation of popular objects, and to bounded pause time relocation of large, popular objects. Handled and unhandled object referencing is described below in greater detail.

Depending on the garbage collection method(s) supported by a particular embodiment of hardware processor 100, write and/or read barrier support may be provided to prevent mutator process 610 from interfering with garbage collector process 620 by altering connectivity of the memory object referencing graph in a way that interferes with the collectors traversal thereof. For example, in one embodiment of hardware processor 100, programmer selectable hardware write barriers to intergenerational pointer stores, to all pointer stores, and to all stores (including support for filtered barrier variants of each) are provided as described in greater detail in the above-incorporated co-pending U.S. patent application Ser. No.: 08/841,543, entitled, "GENERATION ISOLATION SYSTEM AND METHOD FOR GARBAGE COLLECTION," naming James Michael O'Connor, Marc Tremblay, and Sanjay Vishin as inventors, and filed on Apr. 23, 1997. In one embodiment of barrier 660, support for such additional barriers is integrated with the above-described barrier to stores into a partially relocated large object.

In embodiments in accordance with FIG. 1, a partially relocated object trap handler includes JAVA virtual machine instruction bytecodes executable on hardware processor 100 and initiated by program counter and trap control logic 170. Garbage collection traps, including e.g., a partially relocated object trap, are triggered before the trapping write is itself evaluated. Therefore, in order to prevent the processor from trapping infinitely, partially relocated object trap handler 650 emulates the trapping write along with the additional garbage collection-related functions. In one embodiment, program counter and trap control logic 170 then forces the program counter to the next JAVA virtual machine instruction following the trapping write. Based on the more detailed description which follows, those of skill in the art will recognize a variety of valid behaviors for a partially relocated object trap handler depending on consistency policies enforced.

Although garbage collection has been described generally above with respect to the illustrative FIG. 6 embodiment of partially relocated object identifier store 410 including from field 411, to field 412, howfar field 413, and in the context of a barrier 660 potentially including a partially relocated object trap handler, a variety of alternative embodiments are also suitable. In many of these alternative embodiments, a partially relocated object trap handler can be eliminated and mutator process accesses can be properly handled by hardware barrier support, thereby reducing overhead associated with a trap handler. Based on the description of exemplary embodiments which follows, those of skill in the art will appreciate a variety of additional combinations and variations which fall within the scope of the claims.

Write Barrier Associated with Copy-From Instance Identifier Store

Figure 7:
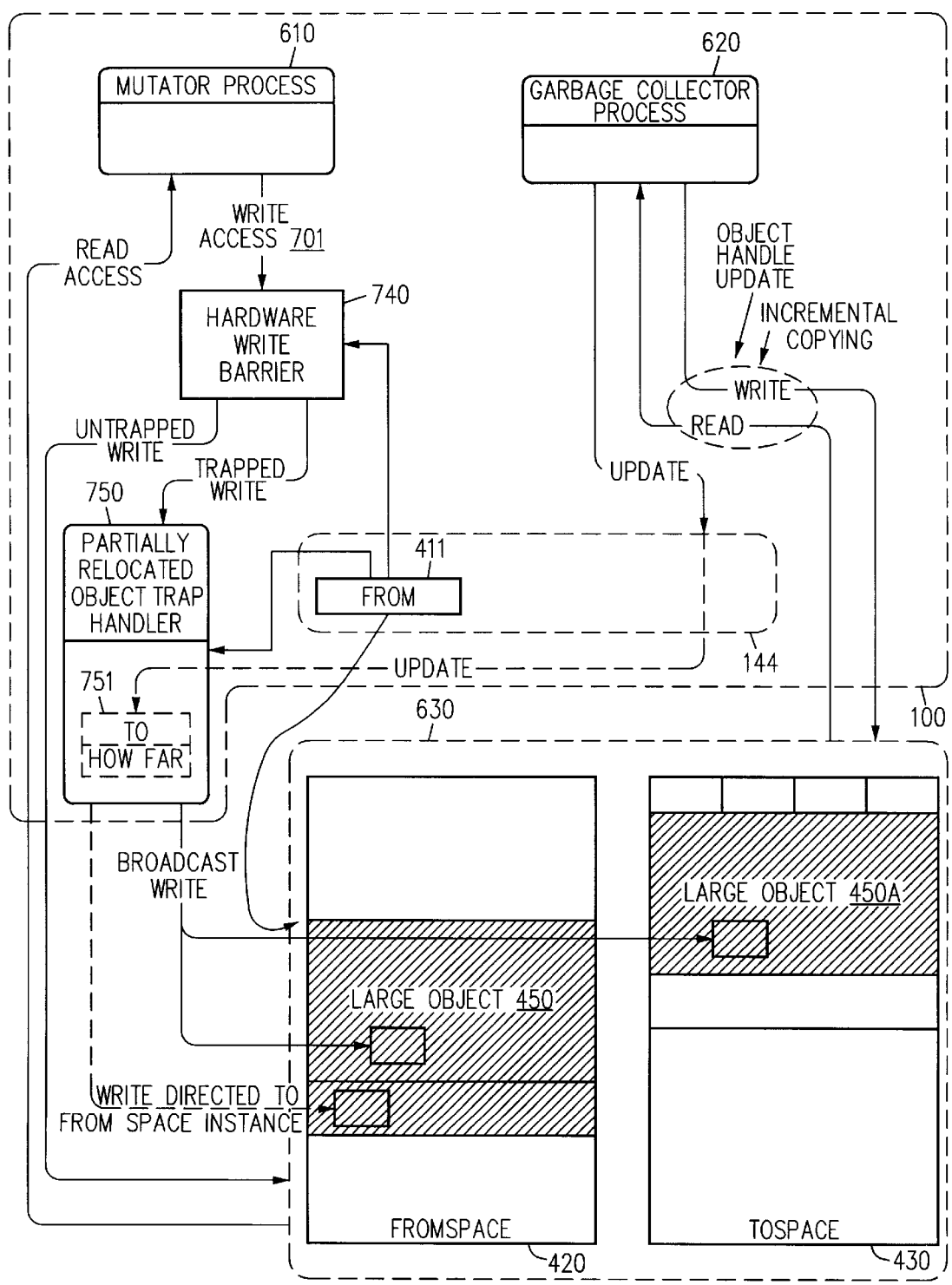
FIG. 7 depicts an embodiment of a bounded-pause time garbage collection system including a barrier to stores to a copy-from instance of a partially relocated object and a trap handler therefor.

FIG. 7 depicts an embodiment having a Copy-From register field with an associated write barrier. In particular, the embodiment of FIG. 7 includes from field 411 of partially relocated object identifier store 410 (see FIG. 4), hardware write barrier 740, and partially relocated object trap handler 750. In the embodiment of FIG. 7, from field 411 is represented in registers 144 of hardware processor 100. Mutator process 610, garbage collector process 620, and partially relocated object trap handler 650 include software executable on hardware processor 100. This embodiment facilitates incremental copying of large objects. However, without additional support, this embodiment is not well suited to incremental update of large numbers of pointers to the ToSpace 430 instance of a popular relocated object. Nonetheless, for garbage collection systems in which objects are referenced via handles, for example, as described below with reference to FIG. 17B, such an embodiment reduces hardware requirements and is viable for bounded pause time relocation since updating a single handle to the ToSpace 430 instance can be trivial.

Mutator process 610 makes read and write accesses from and to collected space 630. Read accesses are unaffected by garbage collection support. However, write accesses are selectively trapped by hardware write barrier 740. Hardware write barrier 740 triggers partially relocated object trap handler 750 in response to a correspondence between the contents of from field 411 and the target objectref associated with write access 701. In this embodiment, partially relocated object trap handler 750, determines, or optionally maintains memory storage for, the Copy-To destination information such as that otherwise stored in to field 412. In addition, garbage collection software may optionally maintain storage for HowFar information such as that otherwise stored in howfar field 413. When mutator process 610 stores to the FromSpace 420 instance of the large object, store data is either broadcast to both the copy-from instance 450 and copy-to instance 450A or, in embodiments which provide storage for howfar information, the howfar storage is inspected and the store is broadcast to both instances if the stored-to field of the large object has already been copied, and otherwise directed to copy-from instance 450. Those of skill in the art will appreciate a variety of methods by which garbage collector process 620 may update to field and howfar field storing variables 751 available to partially relocated object trap handler 750. Update 701 is by any such suitable method.

As described above, garbage collector process 620 updates from field 411 of partially relocated object identifier store 410 to identify copy-from instance 450 of the large object. In this embodiment, no pointers to the copy-to instance are available to mutator process 610 until the handle for the large object has been updated after copying is complete. Therefore, no barrier to accesses to copy-to instance 450A need be maintained. This embodiment is not configured for overlapped copy-from and copy-to instances; however, support for overlapped instances is not necessary for many relocating collector methods, e.g., generational scavenging or copying collector methods.

In one embodiment, hardware write barrier 740 is provided by integer unit 142 (FIG. 1) logic responsible for evaluating a store-oriented bytecode (e.g., putfield_quick, putfield, aastore, etc.). In such an embodiment, logic implementing hardware write barrier 740 traps writes to the Copy-From instance identified by contents of from field 411. For example, the desired behavior of hardware write barrier 640A is described by the following logic equations.

```
if (objectref == FROM) then
    generate gc_notify
``` where gc_notify is an exemplary trap handler. Those of skill in the art will appreciate a variety of suitable logic implementations, including logic implementations combining other write barrier functionality such as intergenerational pointer store trapping, as described above. How far information may optionally be provided as howfar field 413 in registers 144 (see FIG. 4, not shown in FIG. 7) to better tailor trapping by hardware write barrier 740 to only those situations in which broadcast is necessary, thereby reducing overheads associated with partially relocated object trap handler 750 invocations.

Figure 8:
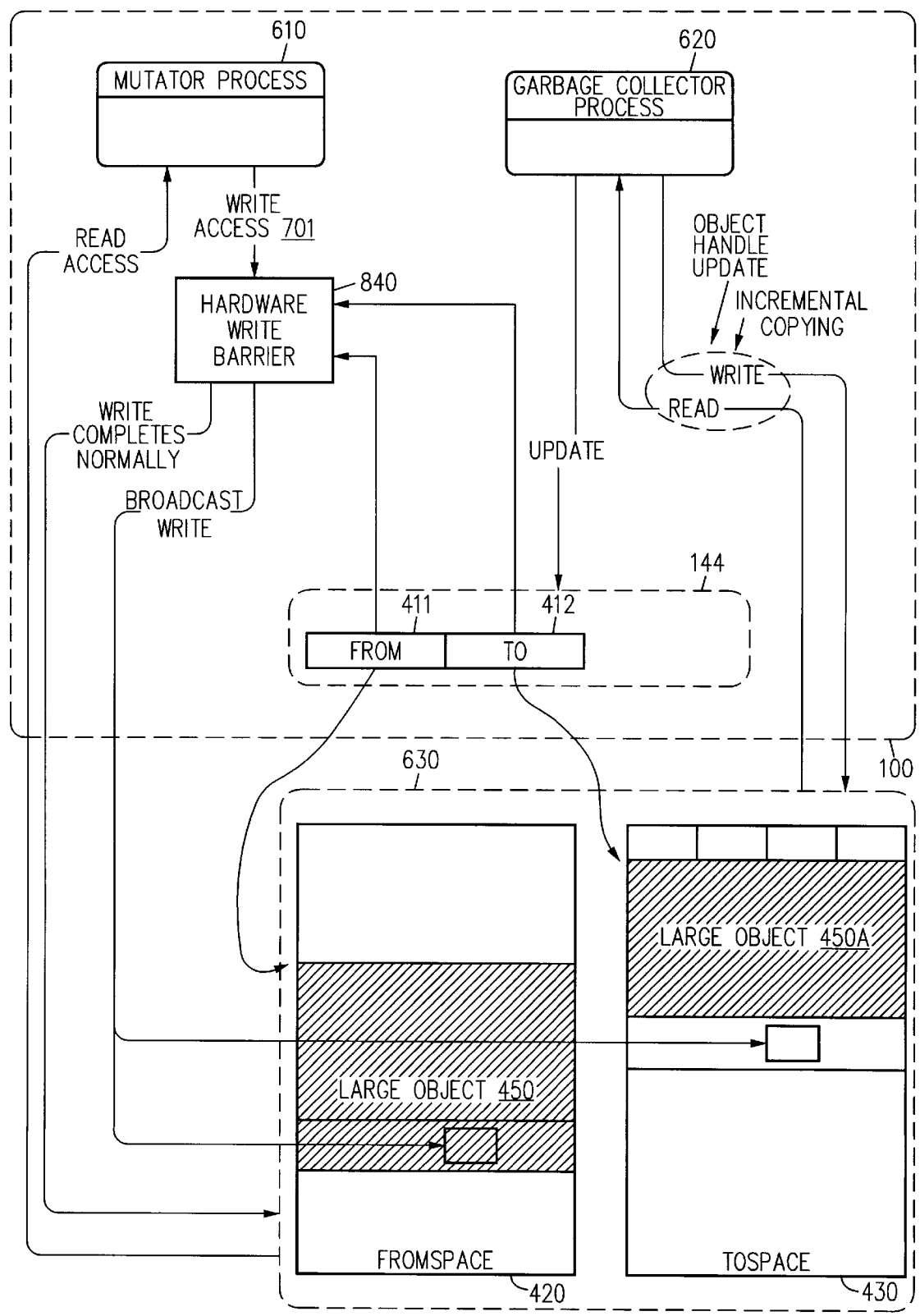
FIG. 8 depicts an embodiment of a bounded-pause time garbage collection system including a hardware barrier to stores to a copy-from instance of a partially relocated object and including a partially relocated object identifier store having copy-from and copy-to instance identifiers. The embodiment of FIG. 8 selectively broadcasts stores to both the copy-from instance and copy-to instance of the partially relocated object.

FIG. 8 depicts an embodiment including a Copy-To register field (e.g., to field 412) in addition to a Copy-From register field (e.g., from field 411) with associated write barrier 840. The embodiment of FIG. 8 provides a write barrier to stores to fields of an object identified by the contents of from field 411 and advantageously eliminates partially relocated object trap handler 750 and its associated overheads. This embodiment facilitates incremental (bounded pause time) copying of large objects, but like that of FIG. 7, is not well suited to bounded pause time update of large numbers of pointers to the ToSpace 430 instance of a copied object. As before, handled object references can mitigate this limitation, allowing overall bounded pause time relocation of even popular large objects, albeit at the expense of an additional level of indirection.

By maintaining a Copy-To register field in hardware, e.g., as to field 412 in registers 144, write accesses to the Copy-From instance can be broadcast to both the Copy-From and Copy-To instances by hardware write barrier 840 without software trap handler intervention. In one embodiment, hardware write barrier 840 is provided by integer unit 142 (FIG. 1) logic responsible for evaluating a store-oriented bytecode. In such an embodiment, logic implementing hardware write barrier 840 broadcasts store_data to both Copy-From and Copy-To instances respectively identified by objectref and contents of to field 412. An exemplary hardware write barrier 840 is described by the following logic equations.

```
if (objectref == FROM)
    store_data => *(objectref + offset)
    store_data => *(TO + offset)
}
``` where offset is the offset into the large object of the target field associated with the store-oriented bytecode. Those of skill in the art will appreciate a variety of suitable logic implementations, including logic implementations combining other write barrier functionality such as intergenerational pointer store trapping, as described above. Because to field 412 is available to hardware write barrier 840, the broadcast can be performed in hardware and software trap overhead is eliminated.

Figure 9:
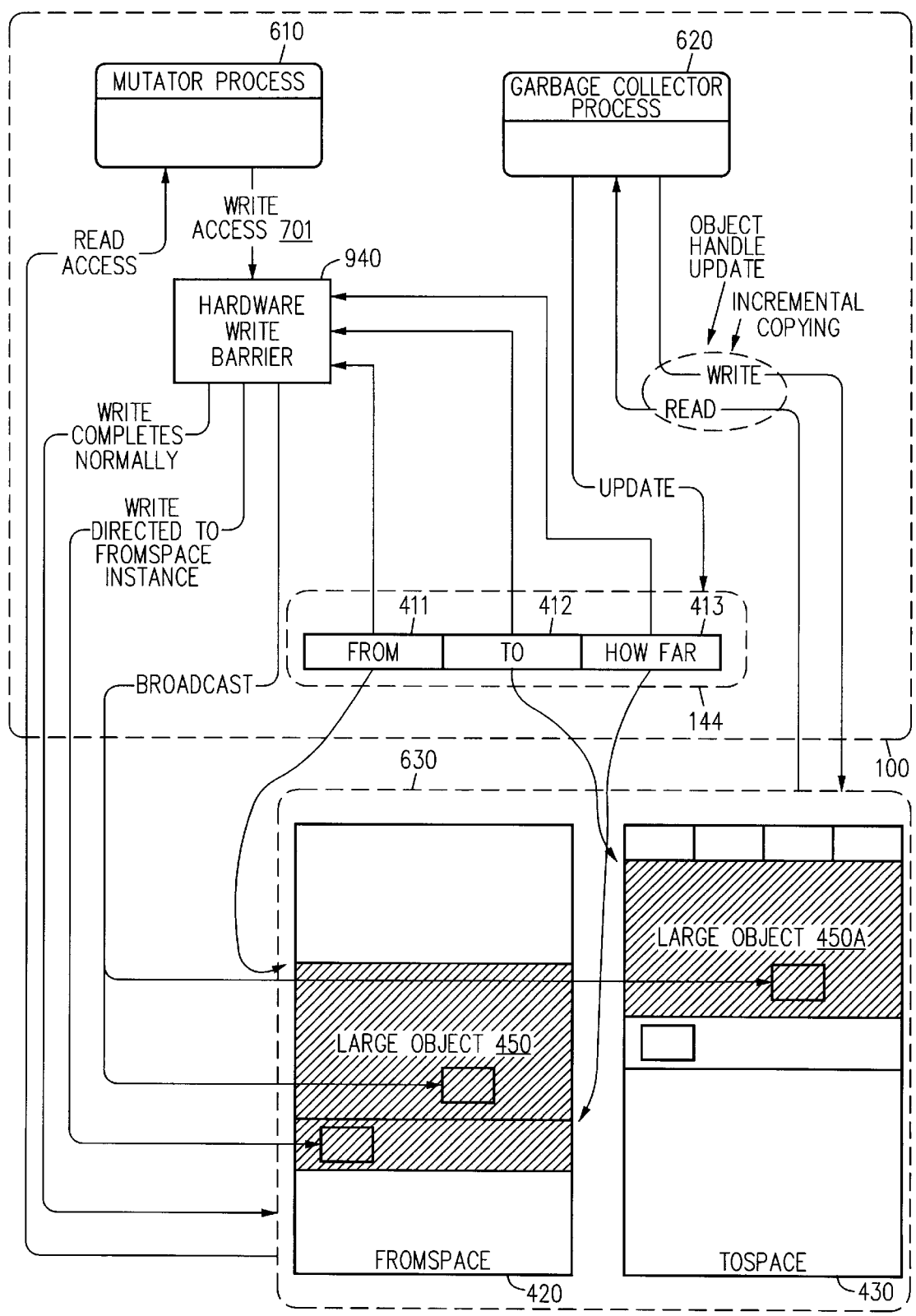
FIG. 9 depicts an embodiment of a bounded-pause time garbage collection system including a hardware barrier to stores to a copy-from instance of a partially relocated object and including a partially relocated object identifier store having a copy-from instance identifier, a copy-to instance identifier, and a copied/uncopied boundary identifier. The embodiment of FIG. 9 selectively directs or broadcasts stores depending on the partial relocation state of the partially relocated object to allow incremental copying.

FIG. 9 depicts an embodiment including Copy-To and How-Far register fields (e.g., to field 412 and howfar field 413) in addition to a Copy-From register field (e.g., from field 411) with associated hardware write barrier 940. The embodiment of FIG. 9 provides a write barrier to stores to fields of an object identified by the contents of from field 411 and advantageously allows hardware write barrier 940 to forgo broadcasting of stores to a not yet copied portion of the large object, while eliminating partially relocated object trap handler 650 and its associated overheads. Like the above embodiments, this embodiment facilitates incremental copying of large objects, but is not well suited to bounded pause time update of large numbers of pointers to the ToSpace 430 instance of a copied object. As before, handled object references can mitigate this limitation, allowing overall bounded pause time relocation of even popular large objects, albeit at the expense of an additional level of indirection.

By maintaining a Copy-To register field in hardware, e.g., as to field 412 in registers 144, write accesses to the Copy-From instance can be broadcast to both the Copy-From and Copy-To instances by hardware write barrier 940. By further maintaining a How-Far register field in hardware, e.g., as howfar field 413 in registers 144, broadcasting can be limited to those write accesses for which the particular target field of the write access has already been copied to ToSpace 430. In either case, handling of the write access to the partially relocated object is without software trap handler intervention. In one embodiment, hardware write barrier 940 is provided by integer unit 142 (FIG. 1) logic responsible for evaluating a store-oriented bytecode. In such an embodiment, logic implementing hardware write barrier 940 broadcasts store_data to both the Copy-From and the Copy-To instances if the target object field is in an already copied portion of the large object, and directs store_data to the Copy-From instance if the target object field is in a not yet copied portion of the large object. An exemplary hardware write barrier 940 is described by the following logic equations.

```
if (objectref == FROM) {
    if offset > HOWFAR then
        store_data => *(TO + offset)
    store_data => *(objectref + offset)
}
``` where offset is the offset into the large object of the target field associated with the store-oriented bytecode. In some embodiments, the directing of store_data to the Copy-From instance may be provided by simply allowing the write access to complete normally without hardware write barrier 940 intervention. Those of skill in the art will appreciate a variety of suitable logic implementations, including logic implementations combining other write barrier functionality such as intergenerational pointer store trapping, as described above. Because howfar field 413 is available to hardware write barrier 940, hardware write barrier 940 can selectively forgo writing store_data to the Copy-To instance. This slight optimization may improve performance by performing only a single write rather than broadcasting two writes.

Write Barrier Associated with both Copy-From and Copy-To Instance Identifier Stores Additional embodiments are now described with reference to FIGS. 10 and 11. Like some of the previously described embodiments, these additional embodiments exploit hardware support (e.g., a hardware write barrier and partially relocated object identifier store 410) to appropriately handle writes to the FromSpace 420 instance of a partially relocated large object without software trap handler intervention. However, in addition, these additional embodiments provide a barrier to writes to the ToSpace 430 instance of a partially relocated large object. In this way, these additional embodiments, support both incremental copying of a large object and incremental update of pointers to a popular object for overall bounded pause time relocation of large and/or popular objects without handled object references.

Figure 10:
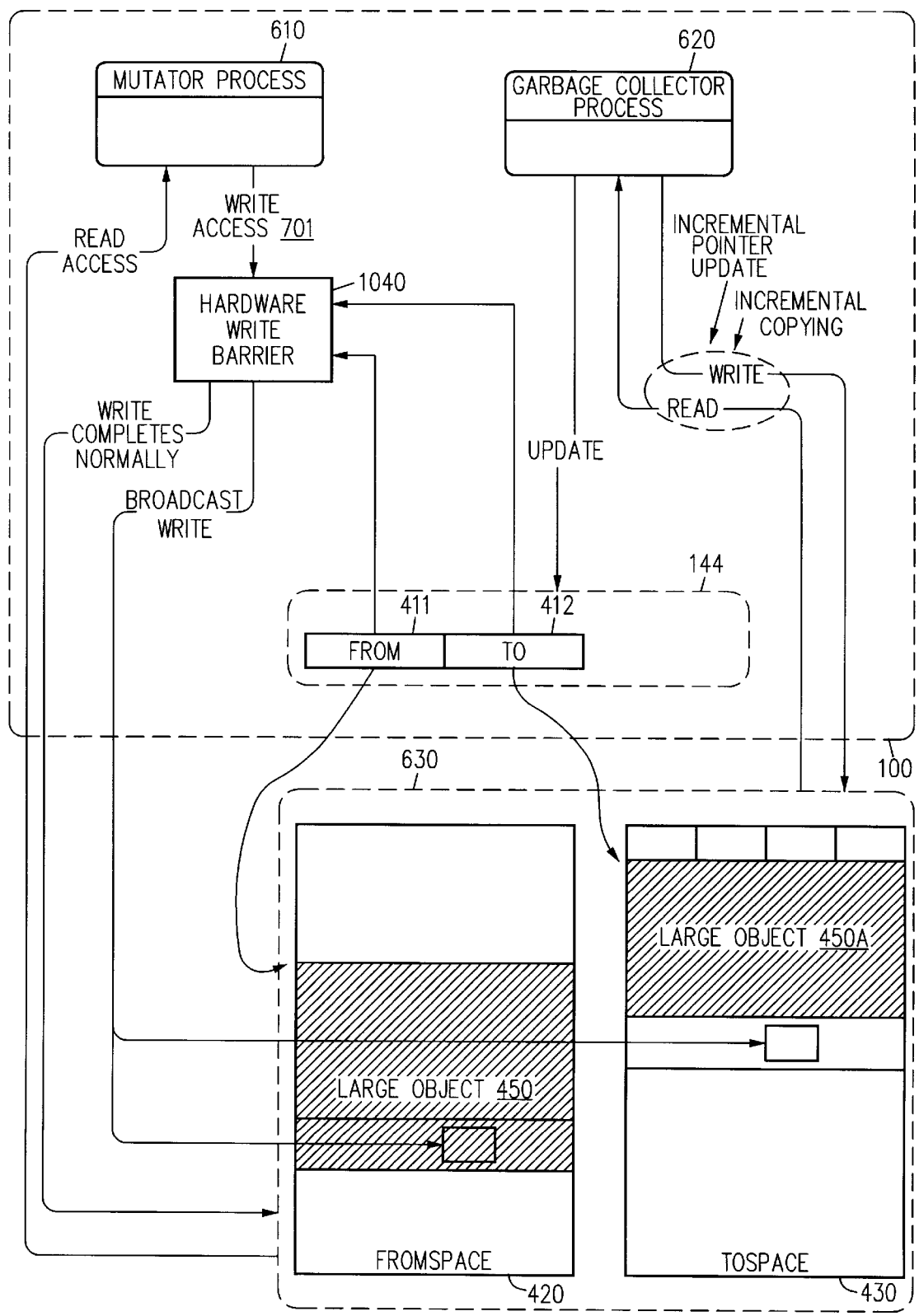
FIG. 10 depicts an embodiment of a bounded-pause time garbage collection system including barriers to stores to copy-from and copy-to instances of a partially relocated object and including a partially relocated object identifier store having copy-from and copy-to instance identifiers. The embodiment of FIG. 10 allows both incremental copying and incremental pointer update.
Figure 11:
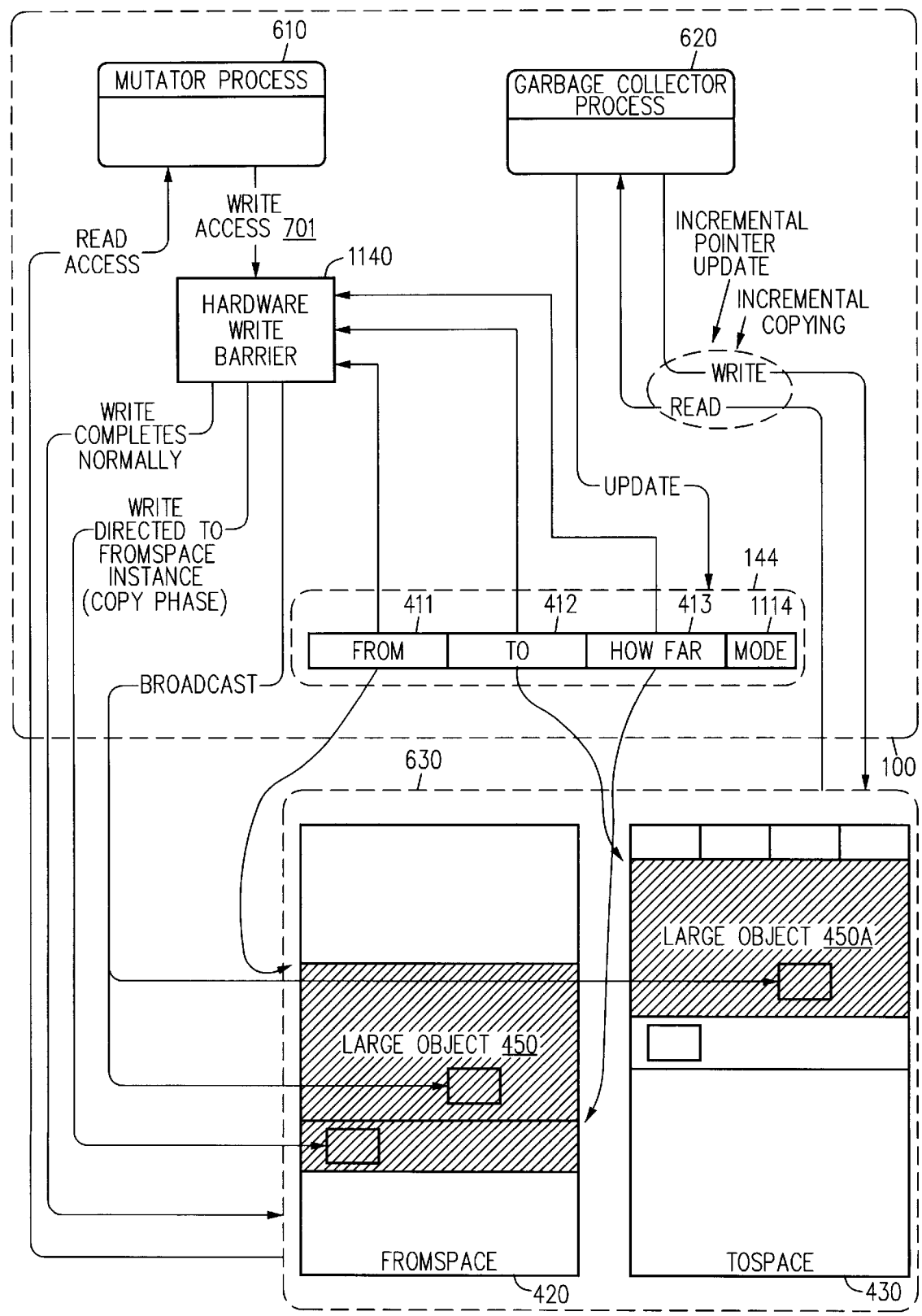
FIG. 11 depicts an embodiment of a bounded-pause time garbage collection system including barriers to stores to copy-from and copy-to instances of a partially relocated object and including a partially relocated object identifier store having a copy-from instance identifier, a copy-to instance identifier, a copied/uncopied boundary identifier, and a garbage collection phase indicator. The embodiment of FIG. 11 selectively directs or broadcasts stores depending on the partial relocation state of the partially relocated object and garbage collection phase to allow both incremental copying and incremental pointer update.

In the embodiments of FIGS. 10 and 11, garbage collector process 620 incrementally updates pointers (i.e., objectrefs) to the large object. Mutator process 610 write accesses to either the FromSpace 420 instance or the ToSpace 430 instance are broadcast (or appropriately directed) by a hardware write barrier, e.g., hardware write barrier 1040 or hardware write barrier 1140, so that the two instances are kept "in sync" while the objectrefs are updated. Because the two instances are kept in sync, the memory referencing structure is robust to referencing states in which some objectrefs refer to a FromSpace 420 instance and others refer to the corresponding ToSpace 430 instance. Bounded pause time update of objectrefs referring to the large object is accomplished by incrementally updating such objectrefs to refer to the ToSpace 430 instance (rather than the FromSpace 420 instance). Note that in the embodiments of FIGS. 10 and 11, the FromSpace 420 instance and the ToSpace 430 instance may not overlap.

Referring to FIG. 10, hardware write barrier 1040 provides a barrier to write accesses to either copy-from instance 450 or copy-to instance 450A. Hardware write barrier 1040 supports incremental, bounded-pause time copying as described above with reference to hardware write barrier 840. However, hardware write barrier 1040 is also responsive to Copy-To register field (e.g., to field 412). Write accesses to either copy-from instance 450 or copy-to instance 450A are broadcast to both copy-from instance 450 and copy-to instance 450A so that the data states of the two instances are synchronized. In this way, objectrefs to the partially relocated large object may be updated incrementally, since a read access to either instance will resolve to the same field state.

In one embodiment, hardware write barrier 1040 is provided by integer unit 142 (FIG. 1) logic responsible for evaluating a store-oriented bytecode. In such an embodiment, logic implementing hardware write barrier 1040 broadcasts store_data to both Copy-From and Copy-To instances respectively identified by the contents of from field 411 and to field 412. An exemplary hardware write barrier 1040 is described by the following logic equations.

```
if ((objectref == FROM) || (objectref == TO)) {
    store_data => *(FROM + offset)
    store_data => *(TO + offset)
}
``` where offset is the offset into the large object of the target field associated with the store-oriented bytecode. Those of skill in the art will appreciate a variety of suitable logic implementations, including logic implementations combining other write barrier functionality such as intergenerational pointer store trapping, as described above. Because from field 411 and to field 412 are available to hardware write barrier 1040, stores to the copy-from instance 450 or copy-to instance 450A respectively identified thereby can be recognized and the broadcast to both instances can be performed in hardware without software trap overhead.

FIG. 11 depicts an embodiment that adds a How-Far register field (e.g., howfar field 413) and a Mode indication (e.g., mode field 1114 of registers 144). As in the embodiment of FIG. 10, hardware write barrier 1140 provides a barrier to write accesses to either copy-from instance 450 or copy-to instance 450A. Hardware write barrier 1140 supports incremental, bounded-pause time copying by ensuring that copied portions of FromSpace 420 and ToSpace 430 instances are kept in sync. Hardware write barrier 1140 advantageously allows hardware processor 100 to forgo broadcasting of stores to a not yet copied portion of the large object during a copying phase, which in the embodiment of FIG. 11, is indicated by a COPY state of mode field 1114. However, during a pointer update phase, indicated by a PTR_UPDATE state of mode field 1114, writes accesses to either copy-from instance 450 or copy-to instance 450A are broadcast to both copy-from instance 450 and copy-to instance 450A. Garbage collector process 620 updates mode field 1114 to correspond to a current phase of a large object relocation.

In one embodiment, hardware write barrier 1140 is provided by integer unit 142 (FIG. 1) logic responsible for evaluating a store-oriented bytecode. In such an embodiment, logic implementing hardware write barrier 1140 broadcasts store_data to both the Copy-From and the Copy-To instances if the target object field is in an already copied portion of the large object or if the large object has been completely copied and relocation has entered a pointer update phase. During the copying phase, logic implementing hardware write barrier 1140 directs store_data to the Copy-From instance if the target object field is in a not yet copied portion of the large object. An exemplary hardware write barrier 1140 is described by the following logic equations.

```
if ((objectref == FROM) || (objectref == TO)) {
    if ((offset ≥ HOWFAR) || MODE == PTR_UPDATE)) then
        store_data => *(TO + offset)
    store_data => *(FROM + offset)
}
``` where the state of mode field 1114, MODE indicates a relocation phase (e.g., COPY or PTR_UPDATE) and offset is the offset into the large object of the target field associated with the store-oriented bytecode. Those of skill in the art will appreciate a variety of suitable logic implementations, including logic implementations combining other write barrier functionality such as intergenerational pointer store trapping, as described above. Because howfar field 413 and mode field 1114 are available to hardware write barrier 1140, hardware write barrier 1140 can selectively forgo writing store_data to the Copy-To instance during the copying phase of a large object relocation, while broadcasting writes during the pointer update phase. This slight optimization may improve performance by performing only a single write, rather than broadcasting two writes, during the copying phase. Additionally, relocation mode may be indicated by allowing garbage collector process 620 to encode completion of the copying phase in a state of howfar field 413. Those of skill in the art will recognize that in the above logic equations, a howfar field 413 value of less than or equal to zero (0) may be used to encode completion of the copy phase thereby obviating mode field 1114.

Read and Write Barriers Associated with Copy-From Instance Identifier Store

Additional embodiments are now described with reference to FIGS. 12–14. Like some of the previously described embodiments, these additional embodiments exploit hardware support (e.g., a hardware write barrier and partially relocated object identifier store 410) to appropriately handle writes to the FromSpace 420 instance of a partially relocated large object. However, these additional embodiments also provide a barrier to reads from a FromSpace 420 instance of a partially relocated large object. In this way, these additional embodiments support bounded-pause time copying as well as bounded pause time update of pointers to the large object without handled object references.

Figure 12:
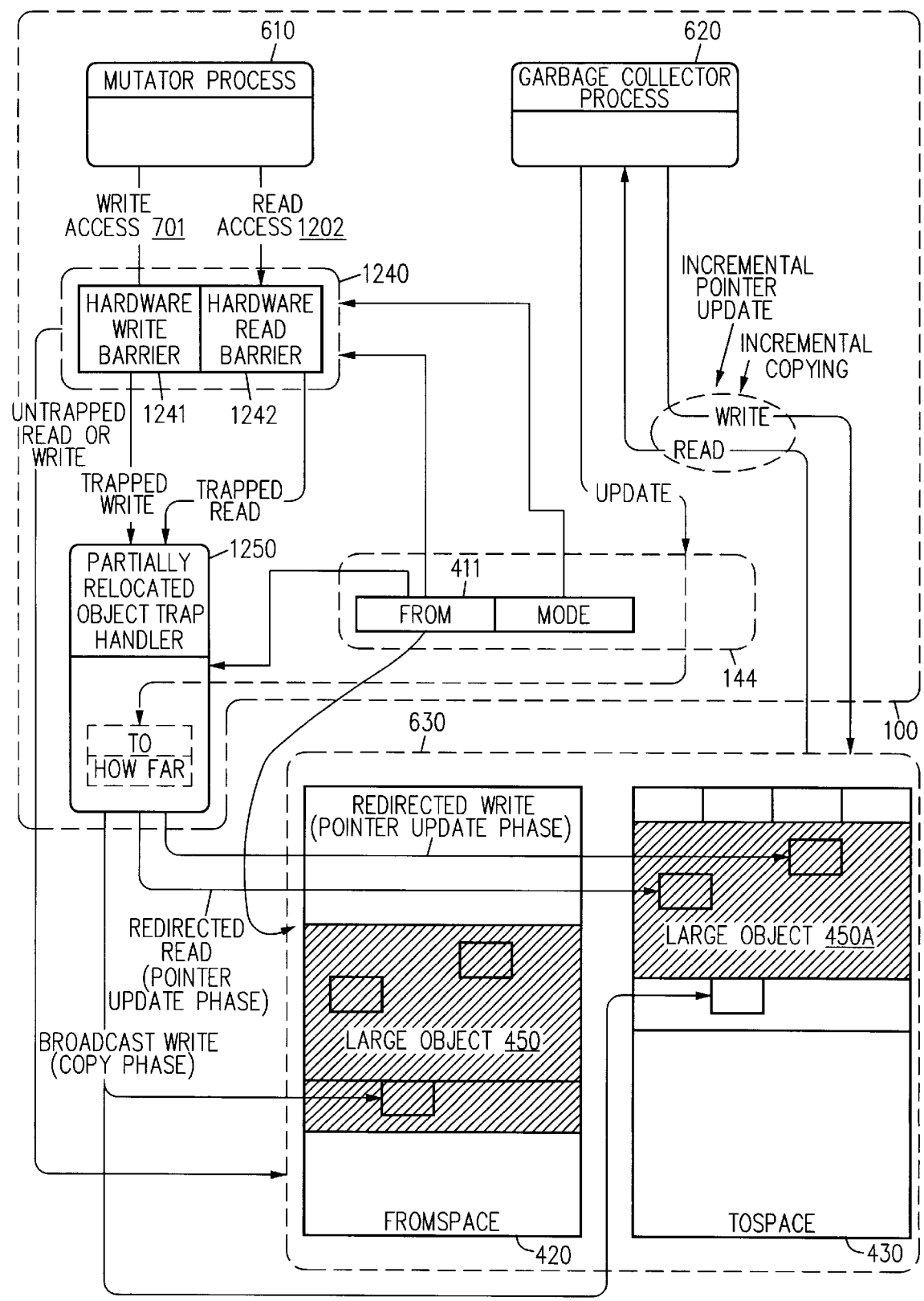
FIG. 12 depicts an embodiment of a bounded-pause time garbage collection system including barriers to loads from a copy-from instance of a partially relocated object and to stores to the copy-from instance and including a partially relocated object identifier store having a copy-from instance identifier, a garbage collection phase indicator, and a partially relocated object trap handler. The embodiment of FIG. 12 selectively redirects or broadcasts stores and selectively redirects loads to allow both incremental copying and incremental pointer update, and in some variations, overlapping copy-from and copy-to instances.
Figure 13:
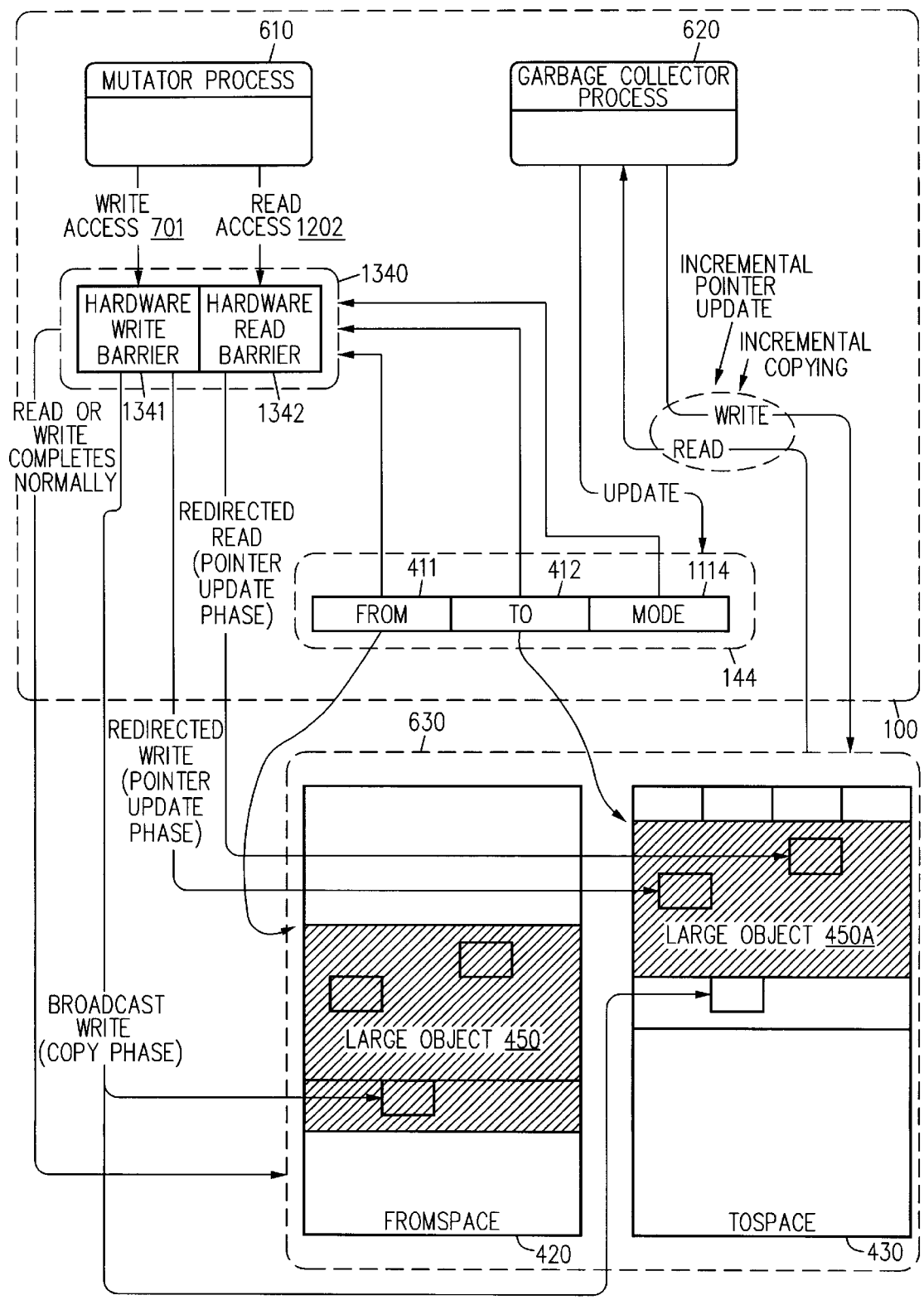
FIG. 13 depicts an embodiment of a bounded-pause time garbage collection system including barriers to loads from a copy-from instance of a partially relocated object and to stores to the copy-from instance and including a partially relocated object identifier store having a copy-from instance identifier, a copy-to instance identifier, and a garbage collection phase indicator. The embodiment of FIG. 13 selectively redirects or broadcasts stores and selectively redirects loads to allow both incremental copying and incremental pointer update.
Figure 14:
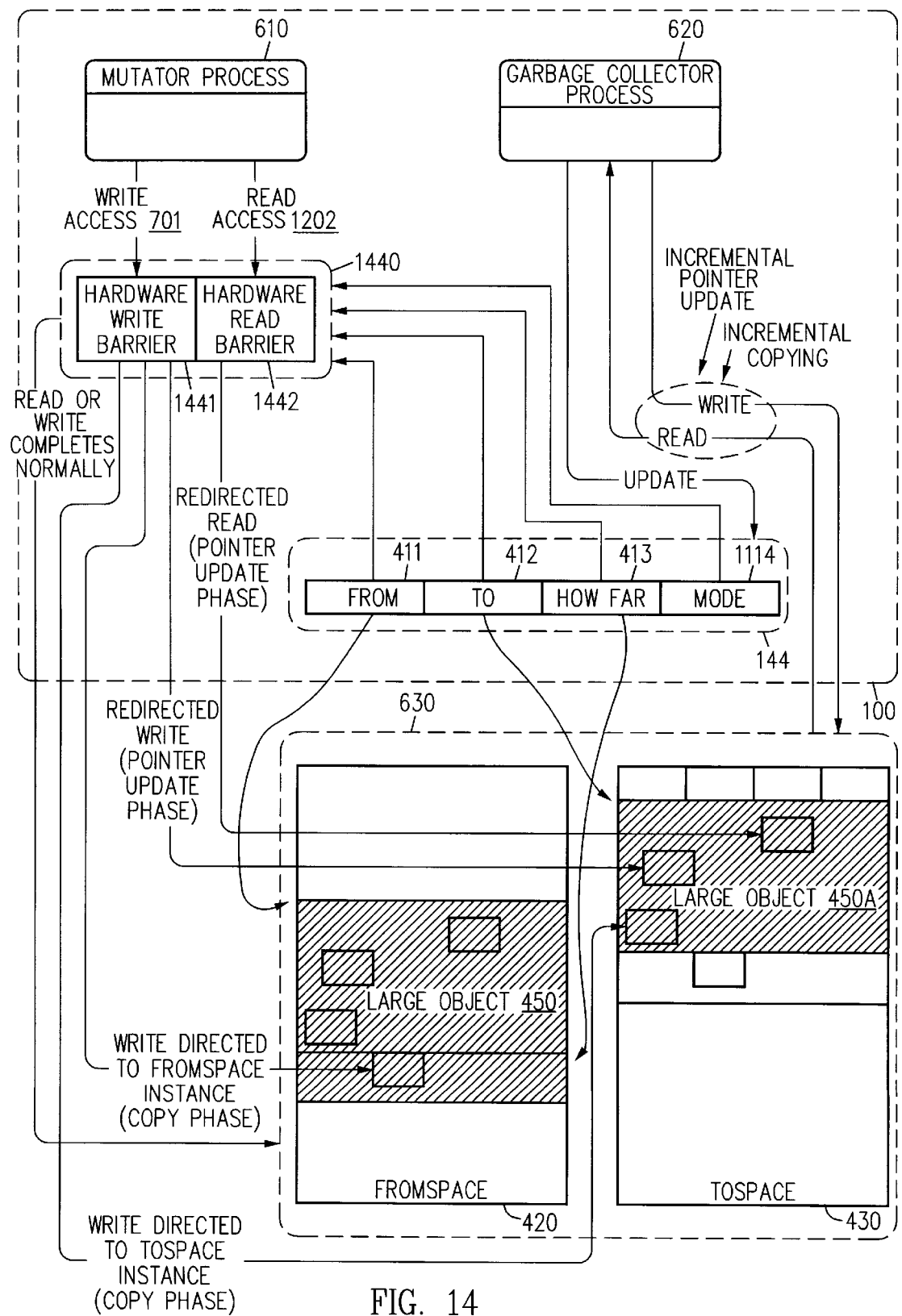
FIG. 14 depicts an embodiment of a bounded-pause time garbage collection system including barriers to loads from a copy-from instance of a partially relocated object and to stores to the copy-from instance and including a partially relocated object identifier store having a copy-from instance identifier, a copy-to instance identifier, a copied/uncopied boundary identifier, and a garbage collection phase indicator. The embodiment of FIG. 13 selectively redirects stores and selectively redirects loads to allow both incremental copying, incremental pointer update, and overlapping copy-from and copy-to instances.

In the embodiments of FIGS. 12–14, garbage collector process 620 incrementally copies the large object from a FromSpace 420 instance to a ToSpace 430 instance during a copy phase (MODE=copy) and incrementally updates pointers (i.e., objectrefs) to the large object during a pointer update phase (MODE=PTR_UPDATE). During the copy phase of large object relocation, mutator process 610 write accesses to the FromSpace 420 instance are broadcast or appropriately directed by a partially relocated object trap handler, e.g., partially relocated object trap handler 1250 (FIG. 12), or by a hardware write barrier, e.g., hardware write barrier 1340 (FIG. 13) or hardware write barrier 1440 (FIG. 14). During the pointer update phase of large object relocation, mutator process 610 write and read accesses to the FromSpace 420 instance are redirected to the ToSpace 430 instance.

FIG. 12 depicts an embodiment including a Copy-From register field with associated read and write barriers. In particular, the embodiment of FIG. 12 includes from field 411, hardware read barrier 1242, hardware write barrier 1241, and partially relocated object trap handler 1250. Hardware read barrier 1242 and hardware write barrier 1241 are shown illustratively as read and write barrier hardware 1240. However, depending on the implementation, hardware write barrier 1241 and hardware read barrier 1242 may share hardware or be based on separate hardware. In one embodiment, integer unit 142 (FIG. 1) logic responsible for evaluating store-oriented bytecodes provides hardware write barrier 1241 and integer unit 142 logic responsible for evaluating load-oriented bytecodes (e.g., getfield_quick, getfield, aaload, etc.) provides hardware read barrier 1242.

Mutator process 610 makes read and write accesses from and to collected space 630. A given read or write access is selectively trapped by read and write barrier hardware 1240 if the read or write access targets the FromSpace 420 instance of a partially relocated object. Read and write barrier hardware 1240 triggers partially relocated object trap handler 1250 in response to a correspondence between the contents of from field 411 and the target objectref associated with write access 701 or read access 1202. In one embodiment, read and write barrier hardware 1240 is responsive to a mode field 1114 of registers 144 which alters the behavior of hardware read barrier 1242 based on mode field 1114 state. In such an embodiment, hardware read barrier 1242 selectively traps only during the pointer update phase of large object relocation.

An exemplary hardware write barrier 1241 is described by the following logic equations.

---
if (objectref == FROM) then
    generate gc_notify
--- where gc_notify is a trap handler such as partially relocated object trap handler 1250. Those of skill in the art will appreciate a variety of suitable logic implementations, including logic implementations combining other write barrier functionality such as intergenerational pointer store trapping, as described above. An exemplary hardware read barrier 1242 is described by the following logic equations.

---
if ((MODE == PTR_UPDATE) && (objectref == FROM)) then
    generate gc_notify
---

Alternative embodiments may selectively trap during both copying and pointer update phases of large object relocation with appropriate handling by partially relocated object trap handler 1250, though at the expense of greater trap handler overhead.

During the copying phase, partially relocated object trap handler 1250, determines, or optionally maintains memory storage for, the Copy-To destination information such as that otherwise stored in to field 412. In addition, partially relocated object trap handler 1250 may optionally maintain storage for HowFar information such as that otherwise stored in howfar field 413. When mutator process 610 stores to the FromSpace 420 instance of the large object, store data is either broadcast to both the copy-from instance 450 and copy-to instance 450A or, in embodiments which provide storage for howfar information, the howfar storage is inspected and the store is broadcast to both instances if the stored-to field of the large object has already been copied, and otherwise directed to copy-from instance 450.

During the pointer update phase, partially relocated object trap handler 1250 directs read and write accesses targeting a FromSpace 420 instance of a partially relocated large object to the ToSpace 430 instance thereof. As before, partially relocated object trap handler 1250, determines, or optionally maintains memory storage for, the Copy-To destination information such as that otherwise stored in to field 412. In either case, partially relocated object trap handler 1250 redirects both read and write accesses to the ToSpace 430 instance. In this way, a read access to the partially relocated object resolves to the ToSpace 430 instance which is guaranteed to be up to date.

Exemplary write trap and read trap functions for partially relocated object trap handler 1250 are as follows:

---
write_trap() {
    if (objectref == FROM) {
        store_data => *(TO + offset)
        if (MODE == COPY)
            store_data => *(objectref + offset)
    }
}
read_trap() {
    if (objectref == FROM) {
        if (MODE == PTR_UPDATE)
            read_destination <= *(TO + offset)
        else read_destination <= *(objectref + offset)
    }
}
--- where read_destination is the destination for a load-oriented bytecode.

Figure 15:
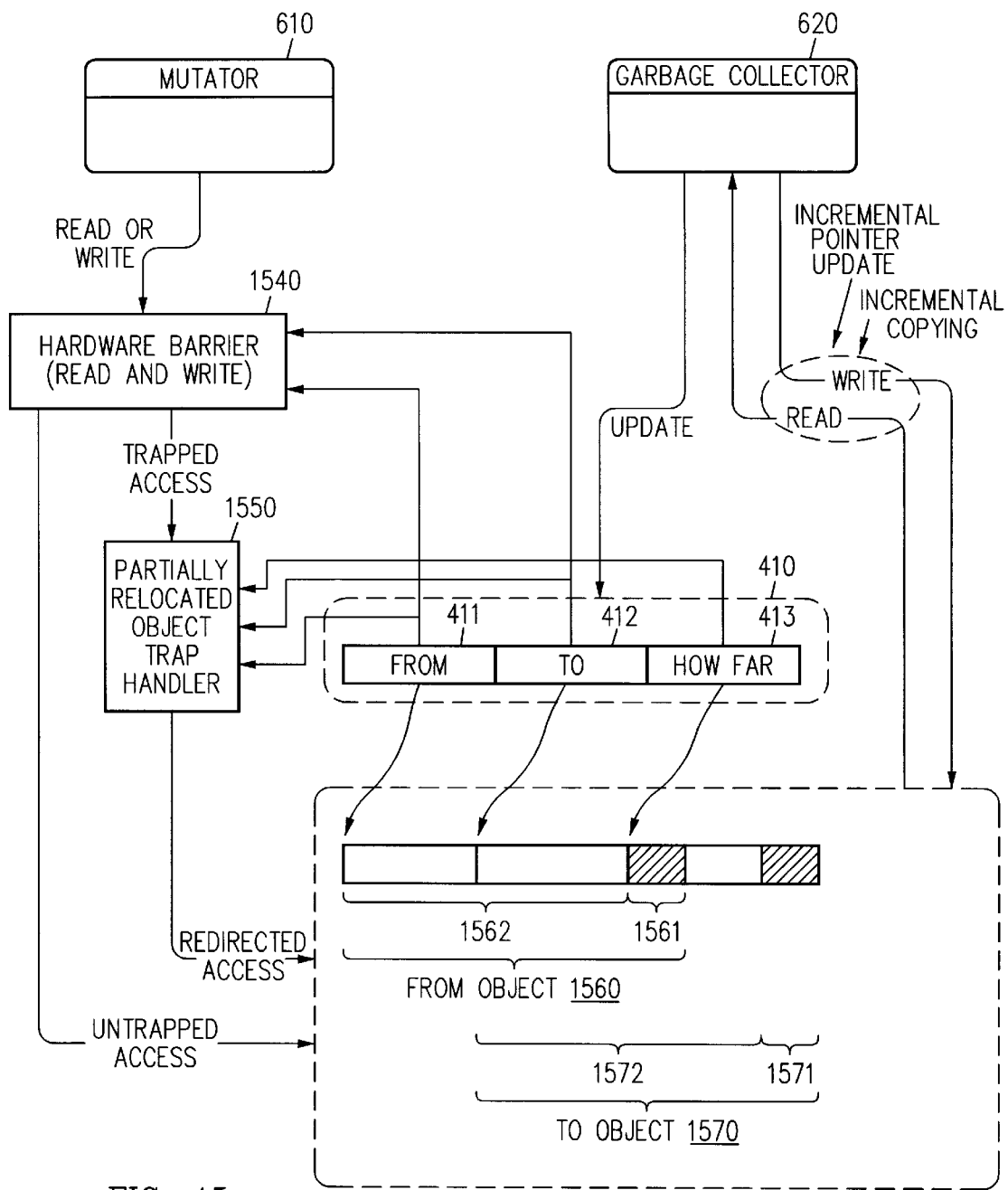
FIG. 15 depicts operation of a bounded pause time garbage collection system allowing overlapping FromSpace and ToSpace portions of a partially relocated large object.

In general, overhead imposed by trapping for the read-barrier case is likely to be greater than that in the case where only a write barrier is provided, because read accesses are typically more common than write accesses in a given instruction stream, and in any case, are in addition to write accesses. In part for this reason, hardware read barrier 1242 is selective for pointer update phase reads from FromSpace 420 instance of the partially relocated large object. However, hardware read barrier 1242 may optionally trap reads from the FromSpace 420 instance of the partially relocated large object regardless of relocation phase. In such an embodiment, partially relocated object trap handler 1250 may be configured to intelligently handle an overlapping copy-from instance 450 and copy-to instance 450A. FIG. 15 illustrates an overlapping from instance 1560 and to instance 1570 wherein a copied portion 1561 has been copied to portion 1571 of to instance 1570. From field 411, to field 412, and howfar field 413 encode the partially-relocated object state as described above. In the embodiment of FIG. 15, garbage collector process 620 copies the large object from back to front (or front to back) depending on the relative overlap of from instance 1560 and to instance 1570. To facilitate overlapped from and to instances, partially relocated object trap handler 1550 does not broadcast writes, and instead directs a write targeting not copied portion 1562 to from instance 1560 and directs a write targeting copied portion 1561 to to instance 1570. A suitable modification to the write trap function of partially relocated object trap handler 1250 is as follows:

```
write_trap() {
    if (objectref == FROM) {
        if (COPY_DIRECTION == BACK_TO_FRONT) {
            if ((offset ≥ HOW_FAR) ||
                (MODE == PTR UPDATE))
                store_data => *(TO + offset)
            else store_data => *(objectref + offset)
        }
        else { /* Copy_DIRECTION == FRONT_TO_BACK */
            if ((offset ≤ HOW_FAR) ||
                (MODE == PTR_UPDATE))
                store_data => *(TO + offset)
            else store_data => *(objectref + offset)
        }
    }
}
``` where COPY_DIRECTION is ascertainable from the relative positions of the from instance 1560 and to instance 1570 as respectively encoded by from field 411 and to field 412. Modifications to the read trap function of partially relocated object trap handler 1250 to appropriately redirect load-oriented accesses are analogous.

FIG. 13 depicts an embodiment including a Copy-To register field (e.g., to field 412) in addition to a Copy-From register field (e.g., from field 411) with associated read and write barrier hardware 1340. As before, this embodiment includes a mode indication (e.g., mode field 1114 of registers 144) maintained by garbage collector process 620 to allow read and write barrier hardware 1340 to distinguish between a copy phase and a pointer update phase of large object relocation. Compared with the embodiment of FIG. 12, that of FIG. 13 provides both a read barrier and write barrier support in hardware (e.g., as hardware read barrier 1342 to stores to fields of an object identified by the contents of from field 411 and a hardware write barrier 1341 to stores to fields of an object identified by the contents of from field 411), thereby advantageously eliminating partially relocated object trap handler 1250 and its associated overheads.

By maintaining a Copy-To register field in hardware, e.g., as to field 412 in registers 144, write accesses to the Copy-From instance can be broadcast during a copy phase (MODE=COPY) to both the Copy-From and Copy-To instances by hardware write barrier 1341 without software trap handler intervention. During a pointer update phase (MODE=PTR_UPDATE), write accesses to the Copy-From instance are redirected to the Copy-To instance by hardware write barrier 1341, again without software trap handler intervention. Read accesses from the Copy-From instance are also redirected during the pointer update phase, to the Copy-To instance by hardware read barrier 1342 without software trap handler intervention. Copy phase read accesses to the Copy-From instance complete normally.

In one embodiment, read and write barrier hardware 1340 is provided by integer unit 142 (FIG. 1) logic responsible for evaluating bytecodes. Hardware write barrier 1341 is provided by integer unit 142 logic responsible for evaluating store-oriented bytecodes and hardware read barrier 1342 is provided by integer unit 142 logic responsible for evaluating load-oriented bytecodes.

During the copy phase, logic implementing hardware write barrier 1342 broadcasts store_data to both Copy-From and Copy-To instances respectively identified by objectref and contents of to field 412, while, during the pointer update phase logic implementing hardware write barrier 1342 redirects store_data to only the Copy-To instance. An exemplary hardware write barrier 1342 is described by the following logic equations.

```
if (objectref == FROM) {
    store_data => *(TO + offset)
    if (MODE == COPY)
        store_data => *(objectref + offset)
}
```

Similarly, an exemplary hardware read barrier 1341 is described by the following logic equations.

```
if (objectref == FROM) {
    if (MODE == PTR_UPDATE)
        read_destination <= *(TO + offset)
    else read_destination <= *(objectref + offset)
}
``` where, in each case, offset is the offset into the large object of the target field associated with the store-, or load-oriented bytecode. Those of skill in the art will appreciate a variety of suitable logic implementations, including logic implementations combining hardware read barrier 1341 and hardware write barrier 1342, as well as implementations combining hardware write barrier 1342 with other write barrier functionality such as intergenerational pointer store trapping, as described above. Because to field 412 is available to hardware write barrier 1342 and to hardware read barrier 1341, broadcast and redirection can be performed in hardware and software trap overhead is eliminated.

FIG. 14 depicts an embodiment that adds a How-Far register field (e.g., howfar field 413). As in the embodiment of FIG. 13, read and write barrier hardware 1440 provides barriers to read and write accesses from and to copy-from instance 450. In addition, read and write barrier hardware 1440 steers read and write accesses to an appropriate From-Space 420 or ToSpace 430 instance depending on whether the field referenced by a store- or load-oriented bytecode has already been copied to the ToSpace 430 instance. Operating in conjunction with howfar field 413, hardware write barrier 1441 advantageously allows hardware processor 100 to forgo broadcasting of stores to a not yet copied portion of the large object during a copying phase indicated by a COPY state of mode field 1114. During the pointer update phase, ToSpace 430 instance is guaranteed to be up to date; therefore, by redirecting read accesses thereto, hardware read barrier 1442 allows hardware processor 100 to advantageously forgo broadcasting of stores during the pointer update phase. Because broadcast stores are eliminated, the embodiment of FIG. 14 is particularly suited to support of overlapping FromSpace 420 and ToSpace 430 instances.

In one embodiment, read and write barrier hardware 1440 is provided by integer unit 142 (FIG. 1) logic responsible for evaluating bytecodes. Hardware write barrier 1441 is provided by integer unit 142 logic responsible for evaluating store-oriented bytecodes and hardware read barrier 1442 is provided by integer unit 142 logic responsible for evaluating load-oriented bytecodes. An exemplary hardware write barrier 1442 is described by the following logic equations.

```
if (objectref == FROM) {
    if (COPY_DIRECTION == BACK_TO_FRONT) {
        if ((offset ≥ HOW_FAR) ||
            (MODE == PTR_UPDATE))
            store_data => *(TO + offset)
        else store_data => *(objectref + offset)
}
```

```
        else { /* COPY_DIRECTION == FRONT_TO_BACK */
            if ((offset ≦ HOW_FAR) ||
                (MODE == PTR_UPDATE))
                store_data => *(TO + offset)
            else store_data => *(objectref + offset)
        }
    }
```

Similarly, an exemplary hardware read barrier 1341 is described by the following logic equations.

```
if (objectref == FROM) {
    if (COPY_DIRECTION == BACK_TO_FRONT) {
        if ((offset ≧ HOW_FAR) ||
            (MODE == PTR_UPDATE))
            read_destination <= *(TO + offset)
        else read destination <= *(objectref + offset)
    }
    else { /* COPY_DIRECTION == FRONT_TO_BACK */
        if ((offset ≦ HOW_FAR) ||
            (MODE == PTR_UPDATE))
            read_destination <= *(TO + offset)
        else read_destination <= *(objectref + offset)
    }
}
``` where read_destination is the destination for a load-oriented bytecode and where, in each case, offset is the offset into the large object of the target field associated with the store-, or load-oriented bytecode. Those of skill in the art will appreciate a variety of suitable logic implementations, including logic implementations combining hardware read barrier 1441 and hardware write barrier 1442, as well as implementations combining hardware write barrier 1442 with other write barrier functionality such as intergenerational pointer store trapping, as described above.

Read and Write Barriers Associated with Copy-To Instance Identifier Store

A series of variations on the embodiments of FIGS. 12–14, include read and write barriers associated with a Copy-To instance identifier store, rather than with a Copy-From instance identifier store. As before, these variations add successive levels of additional hardware support, e.g., from field 411 and howfar field 413 support, to eliminate software trap handler overhead and allow for overlapping copy-from and copy-to instances 450 and 450A. The variations support both bounded-pause time copying and bounded pause time update of pointers to a partially relocated large object. These variations are now described by analogy to the embodiments of FIGS. 12–14 and those of skill in the art will appreciate suitable modifications based on this description.

Garbage collector process 620 updates pointers to the large object, i.e., from the FromSpace 420 instance thereof to a ToSpace 430 instance thereof, before copying of the object data. In this way, the ordering of pointer update and copying phases is reversed. Read and write barriers forward read and write accesses directed at copy-to instance 450A instead to copy-from instance 450. In one embodiment, hardware read and write barriers trap accesses to copy-to instance 450A, invoking a software partially relocated object trap handler that performs the actual forwarding to the Copy-From instance. The partially relocated object trap handler may optionally maintain storage for HowFar information such as that otherwise stored in howfar field 413. When mutator process 610 stores to the ToSpace 420 instance of the large object, store data is directed to the copy-to instance 450A if the stored-to field of the large object has already been copied, and otherwise directed to copy-from instance 450. Similarly, when mutator process 610 loads from the ToSpace 420 instance of the large object, the load is performed from the copy-to instance 450A if the stored-to field of the large object has already been copied, and otherwise performed from copy-from instance 450. Support for overlapped FromSpace 430 and ToSpace 430 instances is provided as described above with respect to the embodiments of FIGS. 12 and 14. Alternatively, if no support for overlapping regions is needed, the read barrier can steer loads to the Copy-From instance, and the write barrier can broadcast stores to both the Copy-From and Copy-To instances.

As above, software trap overhead can be eliminated by putting more registers and more complex behavior into the hardware. For example, one embodiment includes to field 412 and from field 411. A hardware write barrier responsive to correspondence between a store target and to field 412 broadcasts stores to both copy-to instance 450A and copy-from instance 450. A hardware read barrier responsive to correspondence between a load source and to field 412 redirects loads to copy-from instance 450. Another embodiment, includes howfar field 413 in addition to from field 411 and to field 412. The hardware write barrier and the hardware read barrier direct stores and loads to copied portions of copy-to instance 450A and to uncopied portions of copy-from instance 450. Those of skill in the art will appreciate suitable logic for each of the embodiments based on the foregoing description.

Object Referencing Formats

Figure 16:
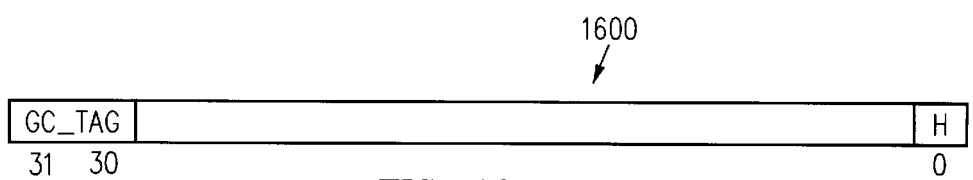
FIG. 16 depicts an object reference (objectref) format in accordance with an embodiment of this invention.

FIG. 16 depicts one embodiment of an object reference (objectref) as represented in hardware processor 100. Three bits of the objectref can be used for garbage collection hints as described in the above-incorporated co-pending U.S. patent application Ser. No.: 08/841,543, entitled, "GENERATION ISOLATION SYSTEM AND METHOD FOR GARBAGE COLLECTION," naming James Michael O'Connor, Marc Tremblay, and Sanjay Vishin as inventors, and filed on Apr. 23, 1997. An additional handle bit H indicates whether the object is referenced by the objectref directly or indirectly-through a handle. Handles provide a referencing method that facilitates, albeit at the cost of an additional level of indirection, relocation of memory objects without large-scale updates of pointers (or objectrefs) thereto. Both of these fields are masked out before being provided to integer unit 142 (FIG. 1) of hardware processor 100.

Figure 17A:
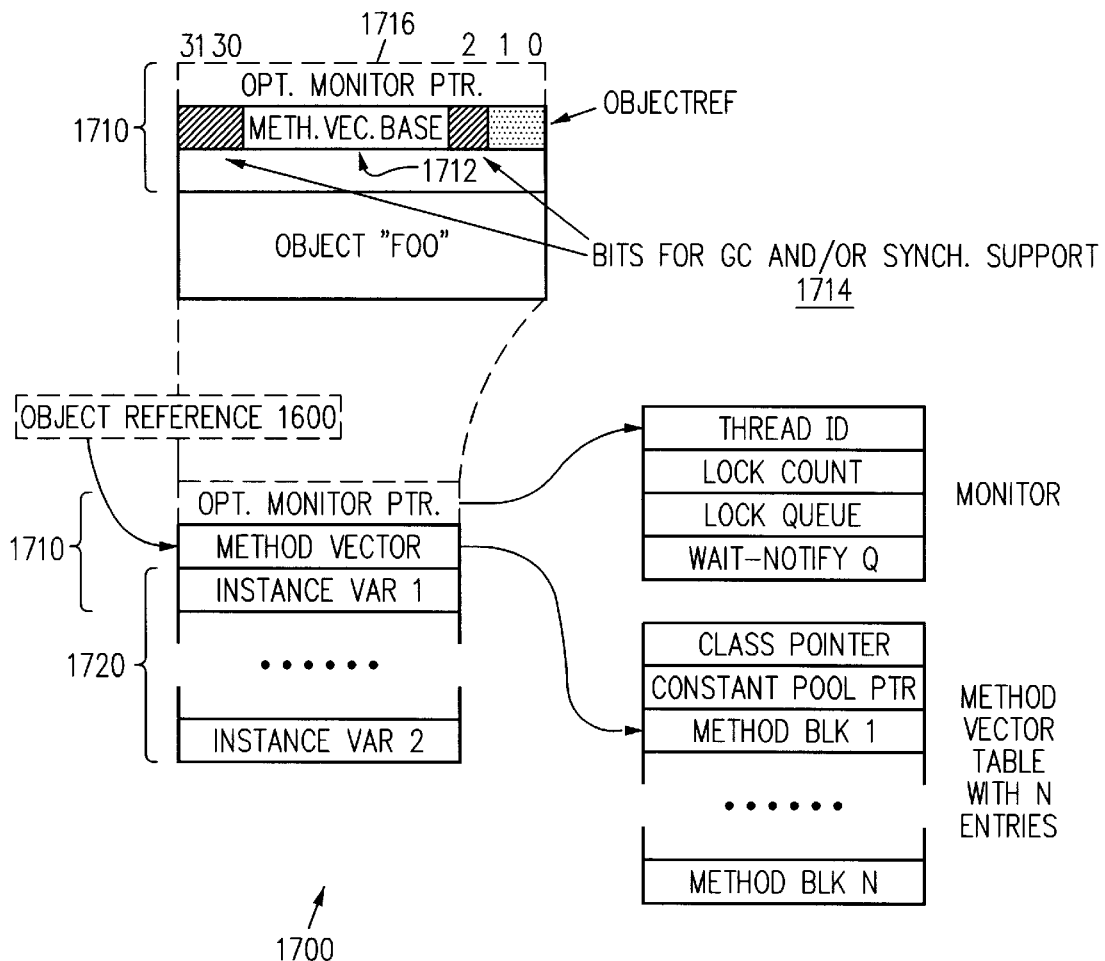
FIG. 17A depicts an object format in accordance with an embodiment of this invention.

In one embodiment of hardware processor 100 and collected space 630 (FIGS. 6–14), an object 1700 is represented in memory including a header portion 1710 and an instance variable storage portion 1720. FIG. 17A depicts one such embodiment. Header portion 1710 includes a 32-bit word that itself includes a method vector table base portion 1712 for representing object's class and five bits of additional storage 1714 reserved for synchronization status of the object and information for the garbage collector. Optionally, a second header-word, e.g., monitor pointer 1716, can contain the address of a monitor allocated for the object, thereby making all five bits of additional storage 1714 in the first header word available for garbage collection information. In the embodiment of FIG. 17A, an object reference (objectref) points to the location of method vector table base portion 1712 to minimize the overhead of method invocation.

Three bits of header portion 1710 are available to a garbage collector such as collector process 620. In header portion 1710, three lower-order-bits (header[2:0]), and two high-order-bits (header[31:30]) are masked off when the header is treated as a pointer. Three of these bits (header [31:30, 2]) are available to the garbage collector to store information about object 1700. Bits 1 and 0 may used to hold LOCK and WANT bits for object synchronization. Alternatively, a second header word, e.g., monitor pointer 1716, can be provided for maintaining the synchronization status of object 1700, leaving all five bits for garbage collection support. How the bits for garbage collection support are used depends on the particular type(s) of garbage collection methods implemented collector process 620 and garbage collection trap handler, if any. Possible uses include mark bits, counter bits to age objects within a generation, etc. As described above, in an optional second header-word embodiment of header portion 1710, five bits are available to a garbage collector such as collector process 620.

Figure 17B:
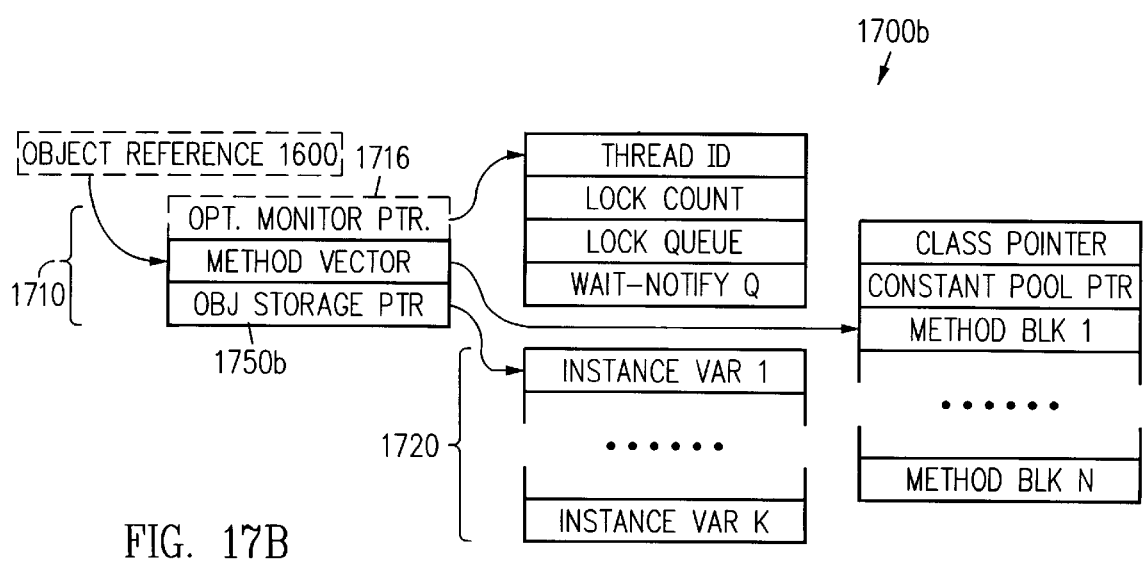
FIG. 17B depicts an alternative handled object format in accordance with an embodiment of this invention.

In the embodiment of FIG. 17A, instance variable storage portion 1720 begins one word after the method vector table base portion 1712 and contains instance variables of object 1700. The least significant bit of an objectref specifies whether the reference is a handled (==1) or not (==0). An alternative, "handled," object format is depicted in FIG. 17B. A handled reference is established when object 1700b is created and all subsequent references go through the handle, i.e., storage pointer 1750b to access the object. This support is provided for some types of garbage collectors which reduce costs of pointer updating during object relocation by copying handles rather than the underlying object storage, including that for instance variables.

Handled object references allow garbage collection systems, such as those described above with reference to FIGS. 7–9, to exhibit bounded pause time performance for pointer updates to a copied object. In other garbage collection systems for which bounded pause time pointer update of large numbers of referencing pointers is supported by the barrier configuration provided thereby, for example, in the embodiments described above with reference to FIGS. 10–14, direct object references are preferable.

While the invention has been described with reference to various embodiments, it will be understood that these embodiments are illustrative and that the scope of the invention is not limited to them. Claim terms such as first instruction, second instruction, third instruction, etc. are for identification only and should not be construed to require a particular ordering. Many variations, modifications, additions, and improvements of the embodiments described are possible. For example, although the present invention has been herein described with reference to exemplary embodiments relating to the JAVA programming language and JAVA virtual machine, it is not limited to them and, instead, encompasses systems, articles, methods, and apparati for a wide variety of processor environments (both virtual and physical). In addition, although certain exemplary embodiments have been described in terms of hardware, suitable virtual machine implementations (JAVA related or otherwise) incorporating a partially relocated object identifier store and barrier(s) responsive thereto in accordance with the above description include software virtual machine instruction processor implementations such as a bytecode interpreter or a just-in-time (JIT) compiler. These and other variations, modifications, additions, and improvements may fall within the scope of the invention as defined by the claims which follow.

What is claimed is:

1. An apparatus comprising:
   memory storage, wherein objects formed therein are relocatable from respective FromSpace instances to respective ToSpace instances thereof,
   a partially relocated object identifier store updatable to identify a particular instance of a particular one of said objects, if any, for which relocation is incomplete, said particular instance being one of a FromSpace instance and a ToSpace instance;
   a write barrier to store-oriented memory accesses targeting said particular instance; and
   a read barrier to load-oriented memory accesses targeting said particular instance,
   said write and said read barriers being responsive to a correspondence between contents of said partially relocated object identifier store and object identifiers for respective of said store-oriented and said load-oriented memory accesses.

2. An apparatus, as recited in claim 1,
   wherein said particular instance is said FromSpace instance;
   wherein said relocation includes a copying phase followed by a pointer update phase; and
   wherein said partially relocated object identifier includes a FromSpace instance identifier.

3. An apparatus, as recited in claim 1,
   wherein said particular instance is said ToSpace instance;
   wherein said relocation includes a pointer update phase followed by a copying phase; and
   wherein said partially relocated object identifier includes a ToSpace instance identifier.

4. An apparatus, as recited in claim 1, wherein said relocation includes temporally overlapped incremental copying and incremental pointer update.

5. An apparatus, as recited in claim 1, wherein said write barrier directs a first of said store-oriented memory accesses to said ToSpace instance and a second of said store-oriented memory accesses to said FromSpace instance, said first and said second store-oriented memory accesses respectively targeting copied and uncopied portions of said particular instance.

6. An apparatus, as recited in claim 5, wherein said write barrier further directs said first store-oriented memory access to said FromSpace instance.

7. An apparatus, as recited in claim 1, wherein said read barrier directs a first of said load-oriented memory accesses to said ToSpace instance and a second of said load-oriented memory accesses to said FromSpace instance, said first load-oriented memory access targeting a copied portion of said particular instance, said second load-oriented memory access targeting an uncopied portion of said particular instance.

8. An apparatus, as recited in claim 7, wherein said read barrier directs a third of said load-oriented memory accesses to said ToSpace instance, said third load-oriented memory access occurring after completion of a copying phase of said relocation.

9. An apparatus, as recited in claim 1, wherein operation of said write barrier allows incremental copying of said particular object from said FromSpace instance thereof to said ToSpace instance thereof.

10. An apparatus, as recited in claim 1, wherein operation of said write and said read barriers allows incremental copying of said particular object from said FromSpace instance to said ToSpace instance, wherein said FromSpace instance and said ToSpace instance overlap in said memory storage.

11. An apparatus, as recited in claim 1, wherein said FromSpace and said ToSpace instances overlap in said memory storage.

12. An apparatus, as recited in claim 1, wherein operation of said read barrier allows incremental update of pointers to said particular object, said incremental update being from FromSpace instance referencing states to ToSpace instance referencing states.

13. An apparatus, as recited in claim 1, wherein said write and said read barriers comprise write and read barrier logic and a partially relocated object trap handler, said write and said read barrier logic responsive to correspondences between contents of said partially relocated object identifier store and object identifiers for respective of said store-oriented and said load-oriented memory accesses, said read and said write barrier logic trapping to said partially relocated object trap handler upon said correspondences.

14. An apparatus, as recited in claim 1, wherein
   said partially relocated object identifier store includes FromSpace and ToSpace instance identifiers; and
   said write and said read barriers comprise write and read barrier logic coupled to said FromSpace and said ToSpace instance identifiers, said write and said read barrier logic responsive to correspondences between object identifiers for respective of said store-oriented and said load-oriented memory accesses and contents of one of said FromSpace instance and said ToSpace instance identifiers.

15. An apparatus, as recited in claim 1, wherein said write and said read barriers comprise write and read barrier logic;
   said partially relocated object identifier store comprises FromSpace and ToSpace instance identifiers and a partial copy position indicator;
   for a first store-oriented access targeting a copied portion of said particular object, said write barrier directs store data to at least said ToSpace instance, and
   for a second store-oriented access targeting an uncopied portion of said particular object, said write barrier directs said store data to said FromSpace instance.

16. An apparatus, as recited in claim 15, wherein
   for said first store-oriented access, said write barrier further directs store data to said FromSpace instance; and
   said read barrier directs a third load-oriented memory access to said ToSpace instance, said third load-oriented memory access occurring after completion of a copying phase of said relocation.

17. An apparatus, as recited in claim 15, wherein
   said read barrier directs a first load-oriented memory access targeting a copied portion of said particular object to said ToSpace instance; and
   said read barrier directs a second load-oriented memory access targeting an uncopied portion of said particular object to said FromSpace instance.

18. An apparatus, as recited in claim 1, further comprising:
   a garbage collection process including first instructions executable on a processor including said partially relocated object identifier store, said write barrier, and said read barrier, said first instructions for incrementally copying portions of said particular object from said FromSpace instance to said ToSpace instance; and
   a mutator process including second instructions executable on said processor for making said load-oriented and said store-oriented memory accesses.

19. An apparatus, as recited in claim 1, wherein said partially relocated object identifier store includes a partial copy position indicator portion indicative of a boundary between a copied portion and an uncopied portion of said particular object.

20. An apparatus, as recited in claim 1, wherein said relocation comprises incrementally copying said particular object from a FromSpace portion to a ToSpace portion of a garbage collected portion of said memory storage and incrementally updating pointers to said particular object.

21. An apparatus, as recited in claim 1,
   wherein said FromSpace and said ToSpace overlap; and
   wherein said relocation comprises incrementally copying said particular object to compact a plurality of said objects in said memory storage.

22. An apparatus, as recited in claim 1, wherein said partially relocated object identifier store is updated by a garbage collection process in correspondence with incremental copying thereby.

23. An apparatus, as recited in claim 1, further comprising:
   a processor embodying said partially relocated object identifier store, said write barrier, and said read barrier; and
   mutator process instructions encoded in media readable by said processor and executable thereby, said mutator process instructions including instructions corresponding to said store-oriented and said load-oriented memory accesses, and
   relocator process instructions encoded in media readable by said processor and executable thereby, said garbage collector process instructions including an instruction sequence to incrementally copy said particular object from said FromSpace instance to said ToSpace instance, to incrementally update FromSpace instance referencing pointers to reference said ToSpace instance, and to maintain said partially relocated object identifier store in correspondence therewith, said instruction sequence being interruptable by said mutator process instructions.

24. An apparatus, as recited in claim 23, wherein said relocator process instructions are selected to perform one of generational garbage collection, mark-sweep-compact-garbage collection, copying garbage collection, and heap compaction with bounded pause time.

25. An apparatus, as recited in claim 23, wherein said processor comprises a hardware processor including register storage and logic embodying said partially relocated object identifier store, said write barrier, and said read barrier.

26. An apparatus, as recited in claim 1, wherein said particular object comprises one of a large object, a popular object, and a large and popular object.

27. An apparatus, as recited in claim 1,
   a hardware processor embodying said partially relocated object identifier store, said write barrier, and said read barrier;
   a communications device coupled to said hardware processor for receiving mutator process instructions for execution on said hardware processor,
   said mutator process instructions including a first instruction corresponding to said store-oriented memory accesses and a second instruction corresponding to said load-oriented memory accesses; and
   media readable by said hardware processor to encode garbage collector process instructions executable and said hardware processor for incrementally copying said particular object and incrementally updating pointers thereto.

28. An apparatus, as recited in claim 1,
further comprising first and second processors coupled to said partially relocated object identifier store and to said memory storage, said first processor including said write and said read barriers;
wherein said relocation comprises incremental copying of said particular object by a garbage collector process executable on said second processor, and
wherein said store-oriented and said load-oriented memory accesses respectively comprise write and read accesses by a mutator process executable on said first processor; and
wherein said partially relocated object identifier store is maintained by said garbage collector process in correspondence with said incremental copying of said particular object.

29. An apparatus, as recited in claim 28, wherein said second processor comprises a special purpose garbage collection processor.

30. An apparatus, as recited in claim 28, wherein said second processor is integral with said memory storage, said second processor and said memory storage together comprising a garbage collected memory module.

31. An apparatus, as recited in claim 1,
wherein said partially relocated object identifier store is further updatable to identify a second of said objects for which relocation is incomplete; and
wherein said apparatus further comprises first and second garbage collection processors coupled to said partially relocated object identifier store and to said memory storage, relocation of said particular and said second objects comprising incremental copying thereof by said first and said second garbage collection processors, respectively.

32. An apparatus comprising:
memory storage, wherein objects formed therein are relocatable from respective FromSpace instances to respective ToSpace instances thereof;
a partially relocated object identifier store updatable to identify a FromSpace instance of a particular one of said objects, if any, for which relocation is incomplete; and
a write barrier to a store-oriented memory access targeting said FromSpace instance; and
a read barrier to a load-oriented memory access targeting said FromSpace instance, wherein, at least during a pointer update phase of said relocation, said read barrier directs said load-oriented memory access to a ToSpace instance of said particular object.

33. An apparatus, as recited in claim 32, wherein during a copying phase of said relocation, said write barrier maintains consistency between said ToSpace instance of said particular object and at least a copied portion of said FromSpace instance.

34. An apparatus, as recited in claim 32,
further comprising a partial copy position indicator indicative of a boundary between a copied and an uncopied portion of said FromSpace instance,
wherein, for a first of said store-oriented accesses targeting said copied portion, said write barrier directs store data to said ToSpace instance,
wherein, for a second of said store-oriented accesses targeting said uncopied portion, said write barrier directs said store data to said FromSpace instance;
wherein, for a first of said load-oriented memory accesses targeting said copied portion, said read barrier directs said first load-oriented memory access to said ToSpace instance; and
wherein, for a second of said load-oriented memory accesses targeting said uncopied portion, said read barrier directs said second load-oriented memory access to said FromSpace instance.

35. An apparatus comprising:
memory storage, wherein objects formed therein are relocatable from respective FromSpace instances to respective ToSpace instances thereof;
a partially relocated object identifier store updatable to identify a ToSpace instance of a particular one of said objects, if any, for which relocation is incomplete;
a write barrier to store-oriented memory accesses targeting said ToSpace instance; and
a read barrier to load-oriented memory accesses targeting said ToSpace instance.

36. An apparatus, as recited in claim 35,
further comprising a partial copy position indicator indicative of a boundary between a copied and an uncopied portion of said ToSpace instance,
wherein said write and said read barriers direct respective of said store-oriented and said load-oriented memory accesses targeting said uncopied portion to said FromSpace instance.

37. A garbage collection system to manage memory object instance consistency during relocation of a particular memory object in a computer system providing bounded pause-time relocation of said particular memory object using incremental copying of said particular object from a first instance to a second instance thereof, said garbage collection system comprising:
a partially relocated object identifier store including identifier fields for said first and said second instances;
write barrier logic responsive to a correspondence between an object identifier for a store-oriented mutator process access and contents of said first instance identifier field; and
read barrier logic responsive to a correspondence between an object identifier for a load-oriented mutator process access and contents of said first instance identifier field.

38. A garbage collection system, as recited in claim 37, wherein said write barrier broadcasts a first of said store-oriented mutator process accesses targeting said first instance of said particular object to both said first and said second instances thereof.

39. A garbage collection system, as recited in claim 37,
wherein said partially relocated object identifier store further includes a partial copy position indicator to identify an uncopied portion of said particular object;
wherein said write barrier logic selectively directs a second of said store-oriented mutator process accesses targeting said uncopied portion of said particular object; and
wherein said read barrier logic selectively directs a third of said load-oriented mutator process accesses sourcing from said uncopied portion of said particular object,
said selective direction by said write and said read barrier being in accordance with a partial relocation state encoded by said copy position indicator.

40. A method for bounding garbage collection pause time, said method comprising:
during relocating of a memory object from a source instance to a target instance thereof, interrupting said relocating in accordance with a bounded pause time commitment to a mutator process;

during said interrupting of said relocating, detecting a correspondence between an object identifier for a write access by said mutator process and contents of a partially relocated object identifier store;

selectively directing, based on a partial relocation state of said memory object, said write access to one of said source instance and said target instance;

during said interrupting of said relocating, detecting a correspondence between an object identifier for a read access by said mutator process and contents of a partially relocated object identifier store;

selectively directing, based on said partial relocation state of said memory object, said read access to one of said source instance and said target instance.

41. A method, as recited in claim 40, wherein, if there exists a correspondence between a copied portion of said memory object and said write access, said selective direction thereof includes direction of said write access to said target instance; and otherwise, direction of said write access to said source instance.

42. A method, as recited in claim 40, wherein, if there exists a correspondence between a copied portion of said memory object and said read access, said selective direction thereof includes direction of said read access to said target instance; and otherwise, direction of said read access to said source instance.

43. A method, as recited in claim 40, wherein said relocating includes incrementally copying data associated with said source instance to said target instance and thereafter incrementally updating pointers thereto.

44. A method, as recited in claim 40, wherein said relocating includes incrementally updating pointers referencing said source instance to instead reference said target instance and thereafter incrementally copying data associated with said source instance to said target instance.

45. A method, as recited in claim 40, wherein said relocating includes incrementally updating pointers referencing said source instance to instead reference said target instance and incrementally copying data associated with said source instance to said target instance, said updating pointers and said incrementally copying being temporally overlapped.

46. A method for relocating a memory object with bounded pause time impact on a mutator process having access thereto, said method comprising:

configuring write and read barriers to respond to respective store-oriented and load-oriented accesses by said mutator process targeting a From instance of said memory object;

incrementally copying said memory object from said From instance to a To instance and incrementally updating pointers thereto;

during said incremental copying and pointer updating, and in response to a first of said store-oriented accesses, directing said first store-oriented access targeting a copied portion of said memory object to said To instance thereof;

during said incremental copying and pointer updating, and in response to a first of said load-oriented accesses, directing said first load-oriented access targeting said copied portion of said memory object to said To instance thereof.

47. A method, as recited in claim 46, wherein said write and read barrier configuring comprises updating a partially relocated object identifier store to identify said From instance.

48. A method, as recited in claim 47, wherein said write barrier configuring further comprises updating said partially relocated object identifier store to identify said To instance.

49. A method, as recited in claim 46, further comprising:

maintaining a partial copy position indicator to discriminate between a copied portion and an uncopied portion of said memory object; and during said incremental copying and in response to a second of said store-oriented accesses targeting said uncopied portion, directing said second store-oriented access to said From instance and not to said To instance.

50. A method, as recited in claim 46, wherein said directing is performed by said write barrier.

51. A method, as recited in claim 46, wherein said directing is performed by trap handler software in response to a trap by said write barrier.

52. A method for relocating a memory object with bounded pause time impact on a mutator process having access thereto, said method comprising:

configuring write and read barriers to respond to respective store-oriented and load-oriented accesses by said mutator process targeting a To instance of said memory object;

incrementally updating pointers referencing said From instance to instead reference a To instance and incrementally copying said memory object from said From instance to said To instance;

during said incremental pointer updating and copying, and in response to a first of said store-oriented accesses, directing said first store-oriented access targeting an uncopied portion of said memory object to said From instance thereof, during said incremental pointer updating and copying, and in response to a first of said load-oriented accesses, directing said first load-oriented access targeting said uncopied portion of said memory object to said From instance thereof.

53. A method comprising:

maintaining a partial relocation state including a FROM instance identifier state, a TO instance identifier state, and a partial copy position indicating state in accordance with incremental copying of a memory object and incremental updating of pointers thereto;

(a) selectively directing, using a hardware read barrier responsive to said partial relocation state, load-oriented memory accesses to either a FROM instance or a TO instance of said memory object; and (b) selectively directing, using a hardware write barrier responsive to said partial relocation state, store-oriented memory accesses to either a FROM instance or a TO instance of said memory object, said (a) and said (b) selective directing maintaining a consistent object representation for a mutator process making said load-oriented and said store-oriented memory accesses.

54. A computing machine comprising:

a processor;

memory, wherein objects formed therein are referenceable by said processor; and means accessible by said processor for identifying a partially collected object in said memory, wherein a correspondence between said partially collected object identifier means and an object identifier for an object reference operation by said processor triggers fault handler means;

means for garbage collecting said memory, wherein said garbage collecting means maintains said partially collected object identifier means to identify a particular one, if any, of said objects for which garbage collection is incomplete, thereby allowing interruption of said garbage collecting means in accordance with a bounded pause time commitment to mutator means executable on said processor.

* * * * *